US012629938B2

(12) United States Patent
Kawakita

(10) Patent No.: US 12,629,938 B2
(45) Date of Patent: May 19, 2026

(54) PRINTING DEVICE

(71) Applicant: BROTHER KOGYO KABUSHIKI KAISHA, Nagoya (JP)

(72) Inventor: Akihiro Kawakita, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 176 days.

(21) Appl. No.: 18/757,047

(22) Filed: Jun. 27, 2024

(65) Prior Publication Data

US 2025/0001758 A1 Jan. 2, 2025

(30) Foreign Application Priority Data

Jun. 28, 2023 (JP) ................................ 2023-106152

(51) Int. Cl.
*B41J 2/14* (2006.01)
*B41J 2/21* (2006.01)

(52) U.S. Cl.
CPC ........... *B41J 2/1433* (2013.01); *B41J 2/2117* (2013.01); *B41J 2202/15* (2013.01)

(58) Field of Classification Search
CPC ..... B41J 2/1433; B41J 2/2117; B41J 2202/15
See application file for complete search history.

(56) References Cited

U.S. PATENT DOCUMENTS

2015/0367658 A1 12/2015 Mashima et al.
2020/0111715 A1* 4/2020 Naohara ............. H10P 72/0604
2023/0014205 A1* 1/2023 Kim ....................... B23Q 3/088
2024/0210166 A1* 6/2024 Jung ....................... G01B 11/24
2024/0222159 A1* 7/2024 Choi ................... H10P 72/0432

FOREIGN PATENT DOCUMENTS

JP 2016002726 A 1/2016

* cited by examiner

*Primary Examiner* — David H Banh
(74) *Attorney, Agent, or Firm* — HOGAN LOVELLS US LLP

(57) ABSTRACT

A printing device includes: a support portion configured to move in a first direction; a head configured to eject ink onto a printing medium supported by the support portion; an ejector device configured to eject a treatment liquid to a region including at least both ends of the support portion in a second direction intersecting the first direction; a bottom plate located below the support portion, both ends of the bottom plate being located outside the both ends of the support portion in the second direction; and a pair of partition plates extending in the first direction and disposed between the both ends of the bottom plate in the second direction and between the bottom plate and the support portion in an up-down direction. Inner surfaces of the partition plates are located between the both ends of the support portion in the second direction.

9 Claims, 13 Drawing Sheets

PRINTING DEVICE

REFERENCE TO RELATED APPLICATIONS

This application claims priority from Japanese Patent Application No. 2023-106152 filed on Jun. 28, 2023. The entire content of the priority application is incorporated herein by reference.

BACKGROUND ART

The present disclosure relates to a printing device including an ejector device that ejects a treatment liquid for forming an underlay of ink or an overlay of ink onto a printing medium.

JP2016-002726A discloses a recording device (printing device) including a tray (support portion) that supports a printing medium such as a T-shirt, a recording head that ejects ink onto the printing medium supported by the tray, a base portion (bottom plate) disposed below the tray, and a conveyance portion that moves the tray together with the base portion. When the tray is conveyed in a conveyance direction (first direction) by the conveyance portion, the printing medium moves relative to the recording head in the conveyance direction. When the ink is ejected from the recording head onto the printing medium, an image is formed on the printing medium.

DESCRIPTION

The base portion described in JP2016-002726A is smaller than a width of the tray in a width direction (second direction) orthogonal to the conveyance direction. Therefore, in a case where the printing medium supported by the tray is a T-shirt or the like, for example, when a sleeve portion thereof hangs down below the tray, the hung down portion cannot be received by the base portion. Therefore, the inventor has considered that the base portion is configured such that both ends thereof are disposed on an outer side with respect to both ends of the support portion in the width direction.

When the image is formed on the printing medium such as a T-shirt, a pretreatment liquid serving as an underlay of ink may be applied to the printing medium before printing. In addition, in order to coat the image formed on the printing medium, a post-treatment liquid for forming an overlay of the ink may be applied after printing. Therefore, the inventor has also considered to provide, to a printing device, an ejector device that ejects a treatment liquid for applying the treatment liquid to a printing medium.

When the ejector device is configured to be able to apply the treatment liquid to at least both ends of the printing medium in the width direction, the treatment liquid ejected from the ejector device may protrude to an outer side with respect to the support portion in the width direction. That is, in the width direction, the treatment liquid may adhere to outer portions of the bottom plate that are located on outer sides with respect to the both ends of the support portion. Therefore, when the printing medium is supported by the support portion next time, the treatment liquid or the like adhering to the outer portions of the bottom plate adheres to the hung down portion of the printing medium and contaminates the hung down portion.

An object of the present disclosure is to provide a printing device capable of preventing contamination of a hung down portion of a printing medium.

The present disclosure provides a printing device including: a support portion configured to move in a first direction and configured to support a printing medium; a head configured to eject ink onto the printing medium supported by the support portion; an ejector device configured to eject a treatment liquid to a region including at least both ends of the support portion in a second direction intersecting the first direction, the treatment liquid for forming an underlay of the ink or an overlay of the ink on the printing medium supported by the support portion; a bottom plate located below the support portion, both ends of the bottom plate being located outside the both ends of the support portion in the second direction; and a pair of partition plates extending in the first direction, the pair of partition plates being disposed between the both ends of the bottom plate in the second direction and between the bottom plate and the support portion in an up-down direction, in which inner surfaces of the pair of partition plates are located between the both ends of the support portion in the second direction.

According to the printing device of the present disclosure, since inner surfaces of a pair of partition plates are located between the both ends of the support portion, a space between the pair of partition plates is located immediately below the support portion, and is a region to which the treatment liquid ejected from the ejector device is less likely to adhere. By disposing the portions hanging down from the both ends of the support portion of the printing medium in this region, the treatment liquid adhering to the outer portion with respect to the both ends of the support portion of the bottom plate in the second direction can be prevented from adhering to the portions. That is, contamination of the hung down portion of the printing medium can be prevented.

FIRST EMBODIMENT

A printing device 1 according to the first embodiment of the present disclosure will be described with reference to the drawings. In the following description, an up-down direction and a front-rear direction (an example of a "first direction") are defined based on a state in which the printing device 1 is installed so as to be usable (state of FIG. 1), and a left-right direction (direction intersecting the front-rear direction; an example of a "second direction") is defined when the printing device 1 is viewed from the front. In the following description, the left-right direction may be referred to as a main scanning direction, and the front-rear direction may be referred to as a sub scanning direction.

Figure 1:
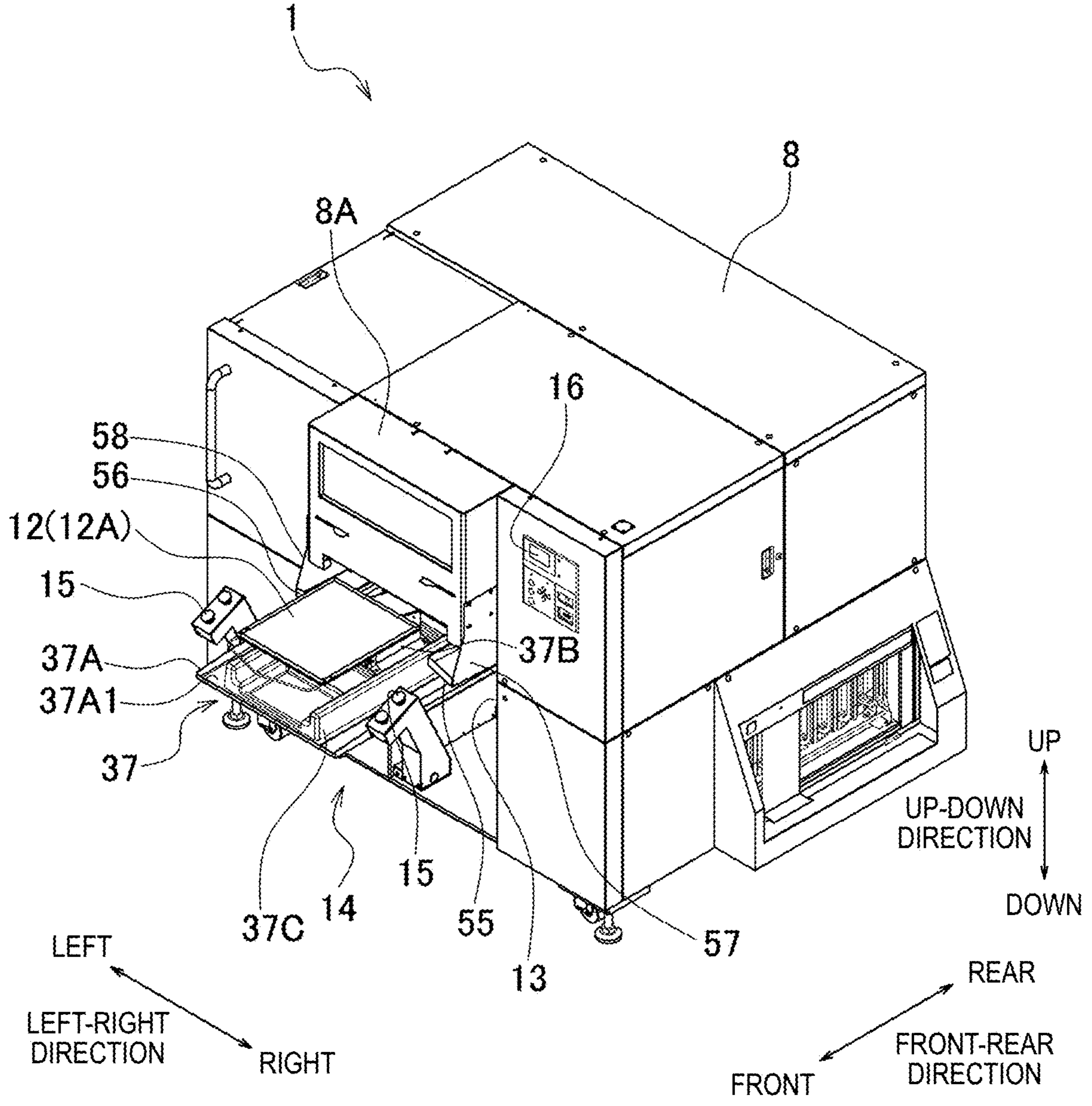
FIG. 1 is a schematic perspective view of a printing device according to a first embodiment of the present disclosure.

The printing device 1 illustrated in FIG. 1 is an ink jet printer, and executes printing by ejecting ink onto a printing medium. The printing device 1 can print a color image on a printing medium using ink of five colors of white, black, yellow, cyan, and magenta. The printing medium is not particularly limited as long as an image can be formed thereon by ejecting ink, and examples thereof include fabric and paper. In the present embodiment, the printing medium is, for example, a T-shirt containing polyester fibers. When the printing device 1 executes printing on the printing medium (T-shirt), a treatment liquid that forms an underlay onto which ink is ejected is applied to the printing medium. The treatment liquid reacts with the ink ejected onto the underlay to aggregate components of the ink, thereby preventing occurrence of bleeding. A volatile component of the treatment liquid contains an organic acid such as formic acid.

Hereinafter, the ink of white among the ink of five colors is referred to as the "white ink". Among the ink of five colors, in a case where the ink of four colors of black, cyan, yellow, and magenta are collectively referred to, or in a case where none of the ink of the four colors is specified, the ink is referred to as the "color ink". The white ink and the color ink are simply referred to as "ink" when collectively referred to, or when not specifying one among them. The white ink is used for printing as a portion representing white of an image or as an underlay of the color ink. The color ink is ejected onto the underlay obtained by the white ink and is used for printing a color image.

An external configuration of the printing device 1 will be described with reference to FIGS. 1 to 3. As illustrated in FIG. 1, the printing device 1 includes a housing 8, a platen 12, a conveyance mechanism 14, an operation unit 15, a display screen 16, an ejector device 40 (see FIG. 2), and a controller 80 (see FIG. 9).

As illustrated in FIG. 1, the housing 8 has a substantially rectangular parallelepiped shape. A platen opening 13 is formed substantially at the center in the left-right and up-down directions of a front surface of the housing 8. Five cartridges (not illustrated) in which the ink of five colors is stored are accommodated in the housing 8. As illustrated in FIGS. 1 and 2, the platen (an example of a "support portion") 12 is a plate-like member having a substantially rectangular planar shape. An upper surface of the platen 12 is a support surface 12A that supports the printing medium. The support surface 12A has a square shape.

As illustrated in FIG. 1, the operation unit 15 is provided at a position that sandwich, in the left-right direction, a platen support portion 37 (to be described later) located forward of the platen opening 13. The operation unit 15 outputs information corresponding to an operation by a user to a controller 80 to be described later. By operating the operation unit 15, the user can input, to the controller 80, a printing start command (including print data) for starting printing by the printing device 1, and the like. The print data includes image data of an image to be formed on the printing medium. The display screen 16 is provided on an upper right side of the front surface of the housing 8 with respect to the platen opening 13. The display screen 16 displays various kinds of information.

The conveyance mechanism 14 conveys the platen 12, on which the printing medium is placed, between an inside of the housing 8 and an outside of the housing 8 through the platen opening 13. When the platen 12 is disposed in a treatment liquid ejection region P4 (see FIG. 2), the treatment liquid is ejected from the ejector device 40, and the treatment liquid is applied to the printing medium. Further, when the platen 12 is disposed in a printing conveyance region P3 (position indicated by a two-dot chain line in FIG. 2) inside the housing 8 illustrated in FIG. 2, the ink is ejected from a head 30 to be described later, and the printing is executed. As illustrated in FIG. 2, the conveyance mechanism 14 includes a support base 36, the platen support portion 37, a pair of right and left rails 38, a transmission member 39, and a sub scanning motor 26 (see FIG. 9).

Figure 2:
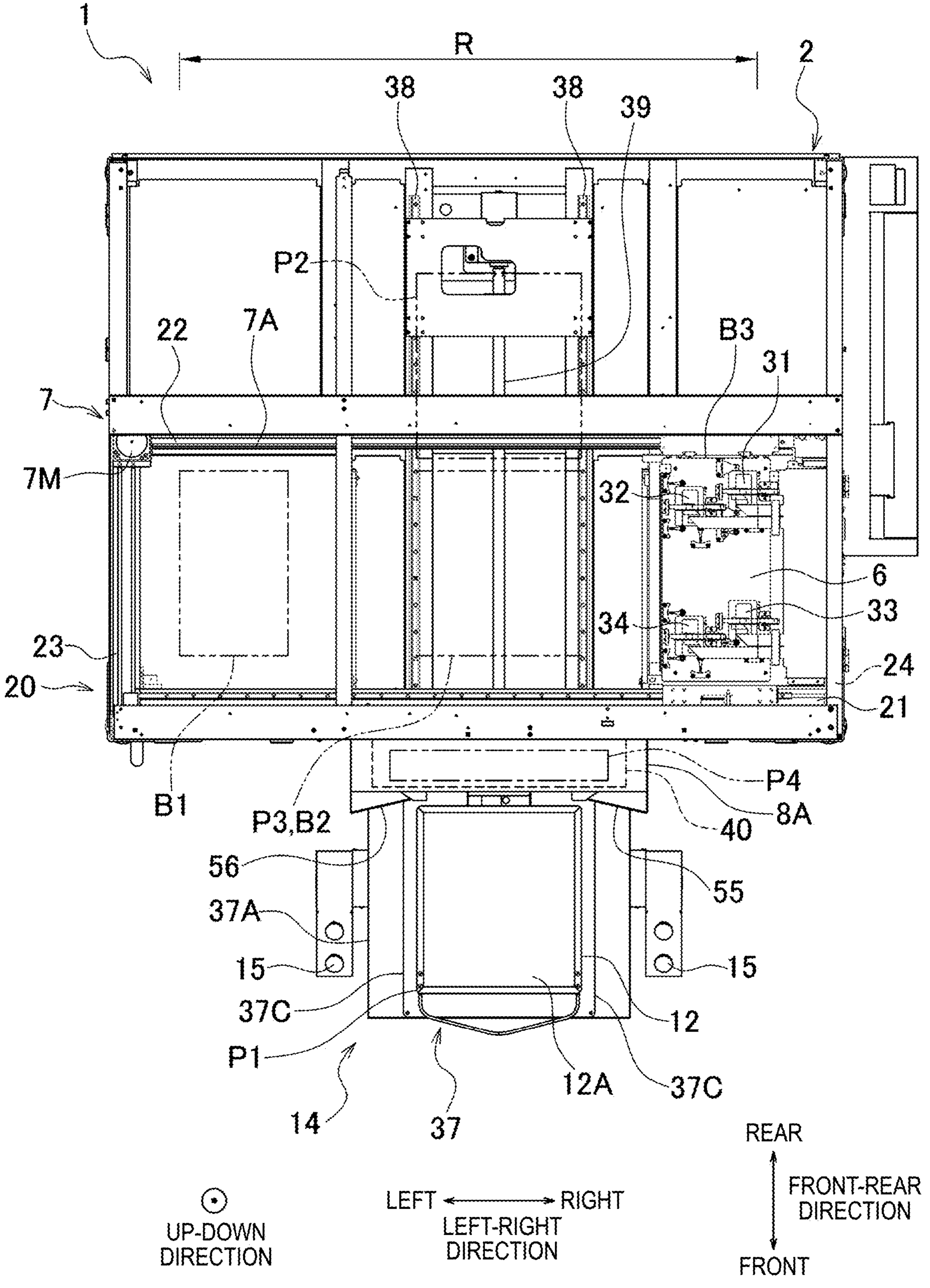
FIG. 2 is a plan view illustrating an internal structure of the printing device illustrated in FIG. 1.
Figure 3:
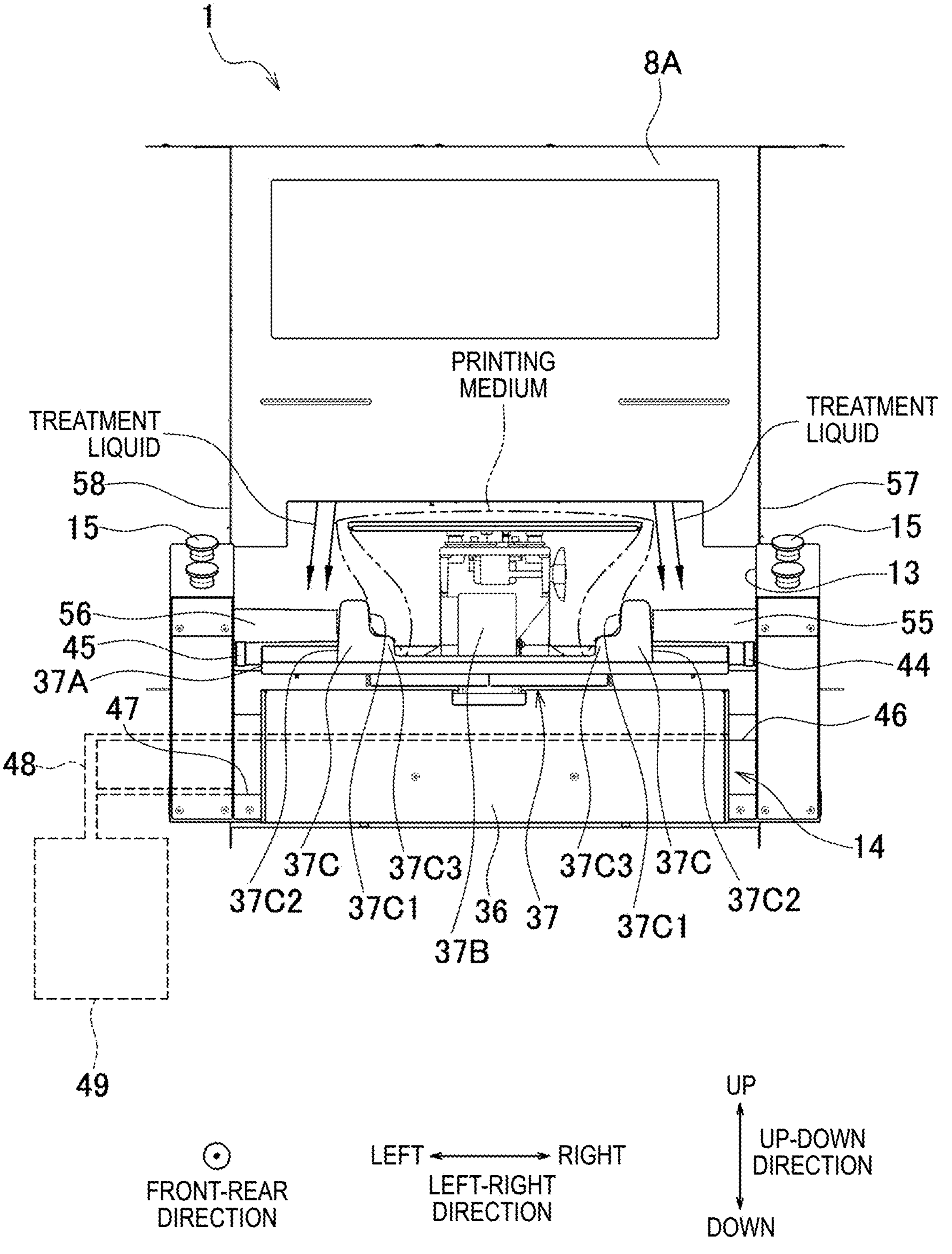
FIG. 3 is a front view of an essential portion of the printing device illustrated in FIG. 1.
Figure 4:
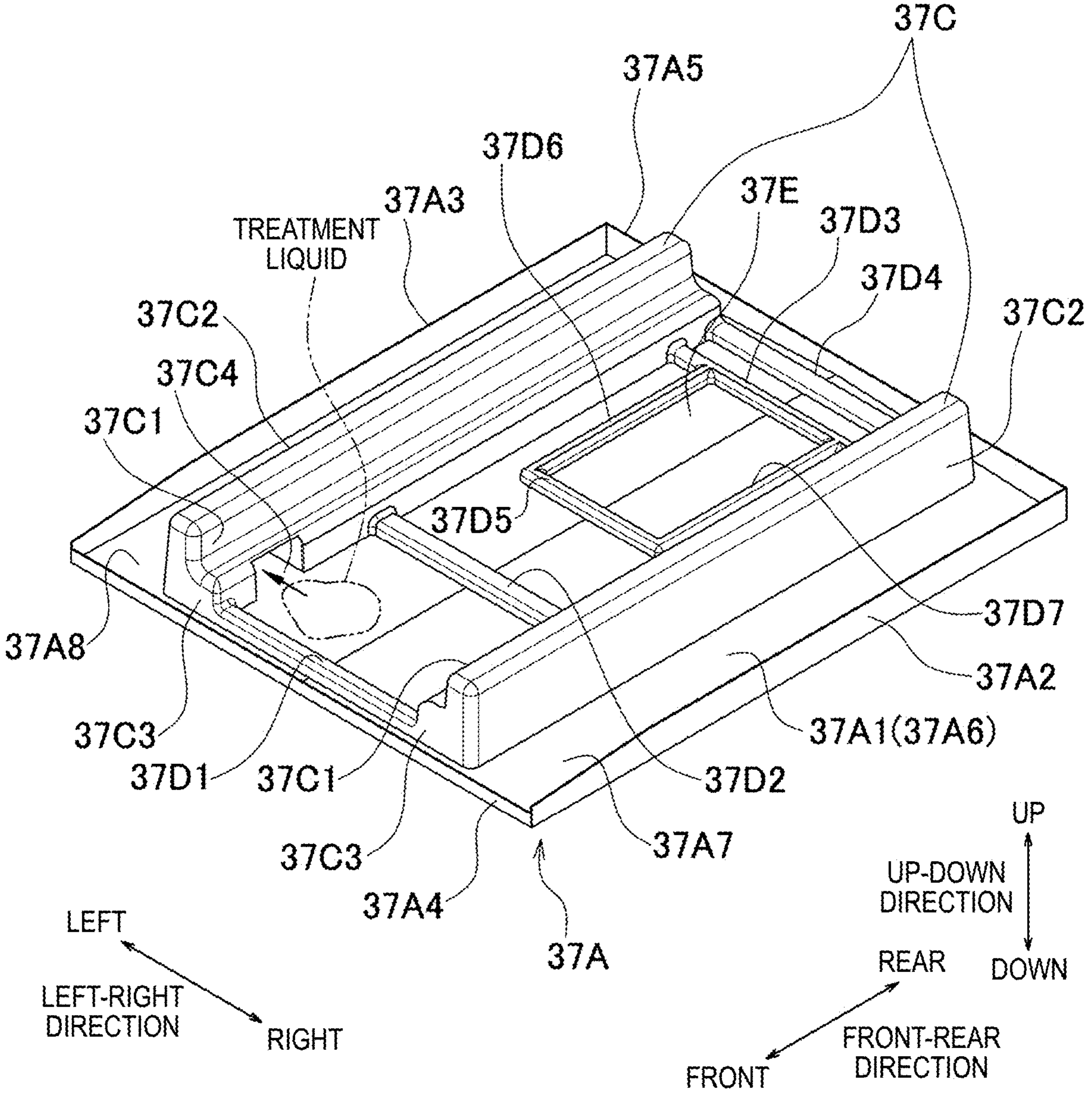
FIG. 4 is a perspective view illustrating a tray and a pair of partition plates illustrated in FIG. 1.
Figure 5A:
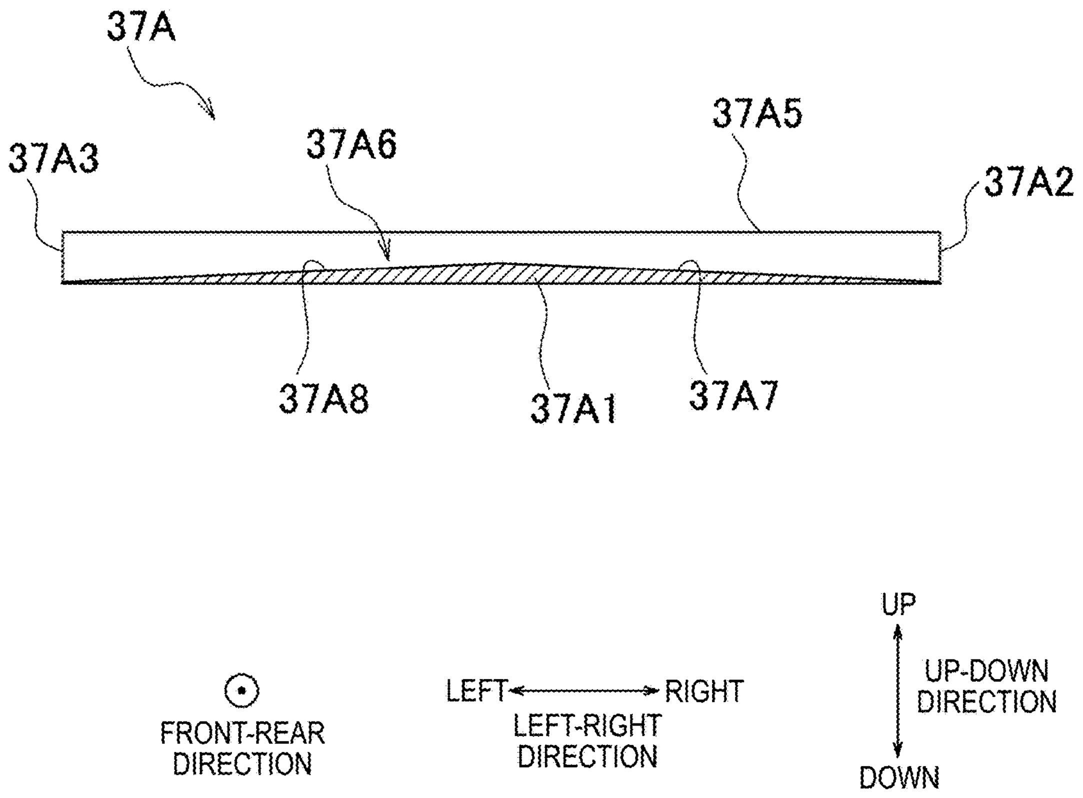
FIG. 5A is a cross-sectional view of the tray illustrated in FIG. 4.

As illustrated in FIGS. 2 and 3, the platen support portion 37 includes a tray 37A, a support portion 37B, and a pair of partition plates 37C. As illustrated in FIGS. 4 and 5A, the tray 37A includes a bottom plate 37A1, a pair of left and right side plates 37A2 and 37A3, a front plate 37A4 on a front side, and a rear plate 37A5 on a rear side.

As illustrated in FIG. 4, the bottom plate 37A1 has a rectangular planar shape of which a length in the front-rear direction is slightly longer than a length in the left-right direction. The lengths of the bottom plate 37A1 in the front-rear and left-right directions are longer than those of the platen 12. In addition, as illustrated in FIG. 5A, the bottom plate 37A1 has two inclined surfaces 37A7 and 37A8 in which an upper surface (bottom surface of the tray 37A) 37A6 of the bottom plate 37A1 is inclined downward from a center to both ends in the left-right direction. The inclined surface 37A7 is located rightward of the upper surface 37A6, and the inclined surface 37A8 is located leftward of the upper surface 37A6. In FIG. 5A, the pair of partition plates 37C and later-described ribs 37D1 to 37D7 are omitted.

The side plate 37A2 extends upward from a right end of the bottom plate 37A1. The side plate 37A3 extends upward from a left end of the bottom plate 37A1. The pair of side plates 37A2 and 37A3 are formed over an entire length of the bottom plate 37A1 in the front-rear direction.

The front plate 37A4 extends upward from a front end of the bottom plate 37A1. The rear plate 37A5 extends upward from a rear end of the bottom plate 37A1. The front plate 37A4 and the rear plate 37A5 are formed over an entire length of the bottom plate 37A1 in the left-right direction. By providing the pair of side plates 37A2 and 37A3, the front plate 37A4, and the rear plate 37A5, the treatment liquid adhering to the bottom plate 37A1 can be prevented from dripping down from an outer edge of the bottom plate 37A1. A discharge port (not illustrated) for discharging the treatment liquid in the tray 37A is formed in the tray 37A. A pipe (not illustrated) is connected to the discharge port, and the treatment liquid in the tray 37A is discharged to waste liquid grooves 46 and 47 (to be described later) through the pipe.

As illustrated in FIG. 3, the support portion 37B extends in the up-down direction, and supports the platen 12 from below. In addition, the support portion 37B has a lower end portion being fixed to the tray 37A, and connects the tray 37A and the platen 12. The lower end portion of the support portion 37B is disposed in a region 37E defined by four ribs 37D3 and 37D5 to 37D7 (to be described later) of the bottom plate 37A1 illustrated in FIG. 4.

As illustrated in FIGS. 3 and 4, the pair of partition plates 37C extend upward from the upper surface 37A6 of the bottom plate 37A1 and extend in the front-rear direction. Of the pair of partition plates 37C, the partition plate 37C on a left side is disposed substantially at a center of the inclined surface 37A8 in the left-right direction. The partition plate 37C on a right side is disposed substantially at a center of the inclined surface 37A7 in the left-right direction.

As illustrated in FIG. 3, the pair of partition plates 37C is disposed on the bottom plate 37A1 such that inner surfaces 37C1 thereof are located on inner sides with respect to both left and right ends of the platen 12 in the left-right direction. In addition, the pair of partition plates 37C has such a thickness that outer surfaces 37C2 thereof are located on outer sides with respect to the both left and right ends of the platen 12 in the left-right direction. A length of the pair of partition plates 37C in the front-rear direction is longer than that of the platen 12. Front ends of the pair of partition plates 37C are disposed forward of a front end of the platen 12, and rear ends of the pair of partition plates 37C are disposed backward of a rear end of the platen 12.

As illustrated in FIGS. 3 and 4, each of the partition plates 37C has a protruding portion 37C3 with a lower portion of the inner surface 37C1 protruding inward in the left-right direction. Accordingly, the lower portion of the inner surface 37C1 is disposed inward of an upper portion thereof. More specifically, a lower portion of the partition plate 37C on the right side is disposed leftward of an upper portion thereof, and a lower portion of the partition plate 37C on the left side is disposed rightward of an upper portion thereof. The protruding portion 37C3 is formed over an entire length of the partition plate 37C in the front-rear direction.

As illustrated in FIG. 4, the partition plate 37C on the left side of the pair of partition plates 37C is formed with a penetration portion 37C4 penetrating in the left-right direction. The penetration portion 37C4 is disposed forward of a center of the partition plate 37C in the front-rear direction. In the present embodiment, the penetration portion 37C4 is formed only in the partition plate 37C on the left side, but a penetration portion may also be formed in the partition plate 37C on the right side. Further, the penetration portion 37C4 may be formed in at least any of the center and a rear side of the partition plate 37C or only in any of the center and the rear side of the partition plate 37C in the front-rear direction.

As another modification, the penetration portion 37C4 may be formed over an entire length of the partition plate 37C in the up-down direction. That is, an upper side of the penetration portion 37C4 may be open.

As illustrated in FIG. 4, four ribs 37D1 to 37D4 and three ribs 37D5 to 37D7 are formed on the upper surface 37A6 of the bottom plate 37A1. The four ribs 37D1 to 37D4 extend along the left-right direction and connect the pair of partition plates 37C. In addition, the four ribs 37D1 to 37D4 are disposed in order from the front and are separated from one another in the front-rear direction. The rib 37D5 extends in the left-right direction. The two ribs 37D6 and 37D7 extend in the front-rear direction. A left end of the rib 37D5 and a front end of the rib 37D6 are connected, and a right end of the rib 37D5 and a front end of the rib 37D7 are connected. Rear ends of the two ribs 37D6 and 37D7 are connected to the rib 37D3. By the four ribs 37D3 and 37D5 to 37D7, a rectangular region 37E in which the lower end of the support portion 37B is disposed is defined.

Returning to FIG. 2, the pair of left and right rails 38 extends in the front-rear direction and supports the platen support portion 37 so as to be movable in the front-rear direction. The pair of rails 38 is disposed on the support base 36 disposed below the platen support portion 37. The support base 36 also extends in the front-rear direction. The support base 36 and the pair of rails 38 are formed so as to extend from the rear toward the front of the housing 8 and protrude to the outside of the housing 8. The transmission member 39 is coupled to the platen support portion 37 and the sub scanning motor 26, and moves the platen support portion 37 in the front-rear direction, that is, the sub scanning direction, in accordance with driving of the sub scanning motor 26.

The user places the printing medium on the support surface 12A of the platen 12 in a state where the platen 12 is disposed on a front side of the front surface of the housing 8, that is, outside the housing 8. A position of the platen 12 illustrated in FIG. 2 is a set position P1 at which the printing medium is supported by the platen 12. The treatment liquid ejection region P4 is a region which is present in the middle of the conveyance path of the platen 12 and in which the treatment liquid is ejected from a spray nozzle 41 (to be described later) of the ejector device 40, and is present below the spray nozzle 41 (that is, in an ejection direction of the treatment liquid). In addition, before printing on the printing medium, the platen 12 moves from the set position P1 to a pre-printing standby position P2 (position indicated by a two-dot chain line in FIG. 2). The pre-printing standby position P2 is located backward of the treatment liquid ejection region P4 and the printing conveyance region P3 and at a rear end portion of a conveyance path of the platen 12. In the conveyance path of the platen 12, the printing conveyance region P3 is a region that overlaps, in the up-down direction, with a movement path of the head 30 in the main scanning direction (left-right direction) to be described later. A movement path of the head 30 in the main scanning direction in the front-rear direction is a path between a rear end of a rearmost head 30 (white head 31) and a front end of a frontmost head 30 (color head 34).

An internal structure of the printing device 1 will be described. As illustrated in FIG. 2, the printing device 1 includes a frame body 2, heads 31 to 34, and a moving mechanism 7 inside the housing 8. The frame body 2 is formed in a lattice shape by a plurality of shafts extending in the front-rear direction, the left-right direction, and the up-down direction. The moving mechanism 7 includes a guide shaft 20 fixed to the frame body 2 and a carriage 6. As illustrated in FIG. 2, the guide shaft 20 includes a front shaft 21, a rear shaft 22, a left shaft 23, and a right shaft 24.

As illustrated in FIG. 2, the front shaft 21 is disposed at a front end portion of the frame body 2, and extends in the left-right direction from a left end portion to a right end portion of the frame body 2. The rear shaft 22 is disposed substantially at a center of the frame body 2 in the front-rear direction, and extends in the left-right direction from the left end portion to the right end portion of the frame body 2. The left shaft 23 is disposed at the left end portion of the frame body 2, and extends in the front-rear direction from a left end of the front shaft 21 to a left end of the rear shaft 22. The right shaft 24 is disposed at the right end portion of the frame body 2, and extends in the front-rear direction from a right end of the front shaft 21 to a right end of the rear shaft 22. The front shaft 21 and the rear shaft 22 support the carriage 6. The conveyance mechanism 14 is fixed to the frame body 2.

As illustrated in FIG. 2, the carriage 6 is supported by the front shaft 21 and the rear shaft 22 so as to be movable in the main scanning direction. The carriage 6 has a plate shape and extends in the front-rear and left-right directions. The carriage 6 extends from the front shaft 21 to the rear shaft 22. As illustrated in FIG. 2, the carriage 6 is provided with white heads 31 and 32 and color heads 33 and 34.

The white heads 31 and 32 and the color heads 33 and 34 have the same structure, respectively, and have a rectangular parallelepiped shape in the present embodiment. Hereinafter, in a case where the white heads 31 and 32 and the color heads 33 and 34 are collectively referred to, or in a case where any of the heads is not specified, the heads are simply referred to as the "head 30". As illustrated in FIG. 2, the white heads 31 and 32 are located at a rear portion of the carriage 6. The white head 31 is located at a right rear portion of the carriage 6. The white head 32 is located on a left side with respect to the white head 31, and is displaced forward with respect to the white head 31. A rear portion of the white head 32 overlaps a front portion of the white head 31 in the left-right direction.

As illustrated in FIG. 2, the color heads 33 and 34 are located to a front side with respect to the white heads 31 and 32. The color heads 33 and 34 are located at the same positions as the white heads 31 and 32 in the left-right direction, respectively. That is, the white heads 31 and 32 and the color heads 33 and 34 are arranged side by side along the sub scanning direction. The color head 34 is located on a left side with respect to the color head 33, and is displaced forward with respect to the color head 33. A rear portion of the color head 34 overlaps a front portion of the color head 33 in the left-right direction.

A plurality of nozzles (not illustrated) are formed on lower surfaces of the heads 30. The plurality of nozzles of the white heads 31 and 32 eject the white ink downward. The plurality of nozzles of the respective color heads 33 and 34 are arranged such that four nozzle arrays extending in the front-rear direction are arranged in the left-right direction. Color ink of different colors corresponds to the four nozzle arrays of the respective color heads 33 and 34, respectively. That is, the plurality of nozzles of the respective color heads 33 and 34 eject the color ink of the colors corresponding to the respective nozzle arrays downward.

The moving mechanism 7 includes a drive belt 7A and a main scanning motor 7M. The drive belt 7A is connected to a rear end portion of the carriage 6. The drive belt 7A is provided on the rear shaft 22 and extends in the left-right direction. A left end portion of the drive belt 7A is connected to the main scanning motor 7M. When the main scanning motor 7M is driven, the drive belt 7A moves the carriage 6 in the left-right direction along the front shaft 21 and the rear shaft 22. That is, the moving mechanism 7 moves the carriage 6 on which the head 30 is mounted in the main scanning direction. FIG. 2 illustrates a state where the carriage 6 is located at a right end of a moving range R.

In FIG. 2, the moving range R of the head 30 is shown as a maximum range in which the carriage 6 can move in the main scanning direction. The head 30 is mainly disposed at any of the maintenance position B1, the ejection region B2, and the head standby position B3 by the moving mechanism 7. The maintenance position B1 is a left end portion of the moving range R of the head 30, and is a position where the head 30 is maintained by a maintenance unit such as a wiper or a cap (not illustrated). The printing device 1 moves the head 30 to the maintenance position B1 during non-printing, and executes the maintenance by the maintenance unit. The ejection region B2 is a region between the maintenance position B1 and the head standby position B3 in the main scanning direction, and overlaps with the conveyance path (printing conveyance region P3) of the platen 12 in the up-down direction in the movement path of the head 30. In addition, when the head 30 passes through the ejection region B2 by the carriage 6, the head 30 ejects ink according to the print data, and printing is executed on the printing medium on the platen 12. The head standby position B3 is at a right end of the moving range R of the head 30, and is a position where the head is disposed in a case where the operator performs an operation such as cleaning the head 30. For example, the printing device 1 moves the head 30 to the head standby position B3 and causes the head 30 to stand by based on an instruction input from the operation unit 15 by a user operation.

In the printing device 1, by moving the platen 12 in the sub scanning direction by driving of the sub scanning motor 26 in the printing conveyance region P3, and moving the carriage 6 in the main scanning direction by driving of the main scanning motor 7M in the ejection region B2, the printing medium moves relative to the head 30 in the sub scanning direction and the main scanning direction.

An operation of moving the head 30 in the main scanning direction and ejecting ink onto the printing medium when the head 30 faces the printing medium is referred to as "ejection scanning". The printing device 1 executes printing on the printing medium by repeating the ejection scanning and the moving of the platen 12 in the sub scanning direction. For example, the printing device 1 ejects white ink from the white heads 31 and 32 to form an underlay of the color ink on the printing medium in the ejection scanning. The printing device 1 prints a color image by ejecting color ink from the color heads 33 and 34 onto the underlay formed on the printing medium in the ejection scanning.

The ejector device 40 is covered with a cover 8A provided on the front surface of the housing 8. The cover 8A protrudes forward of the front surface of the housing 8, and is disposed above the platen 12. In addition, the cover 8A is formed in a box shape whose lower side is open.

Figure 6:
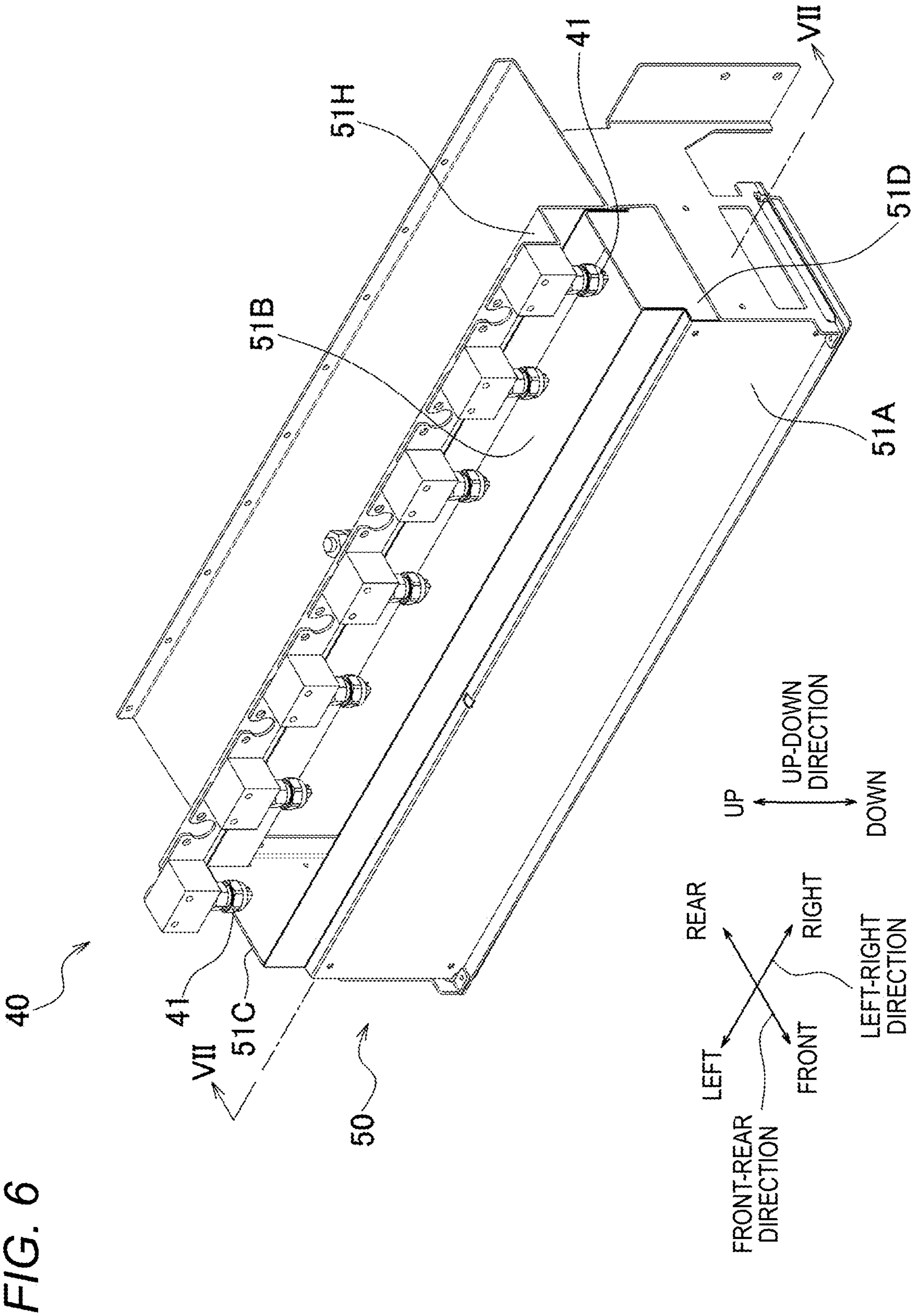
FIG. 6 is a perspective view of an ejector device illustrated in FIG. 2.
Figure 7:
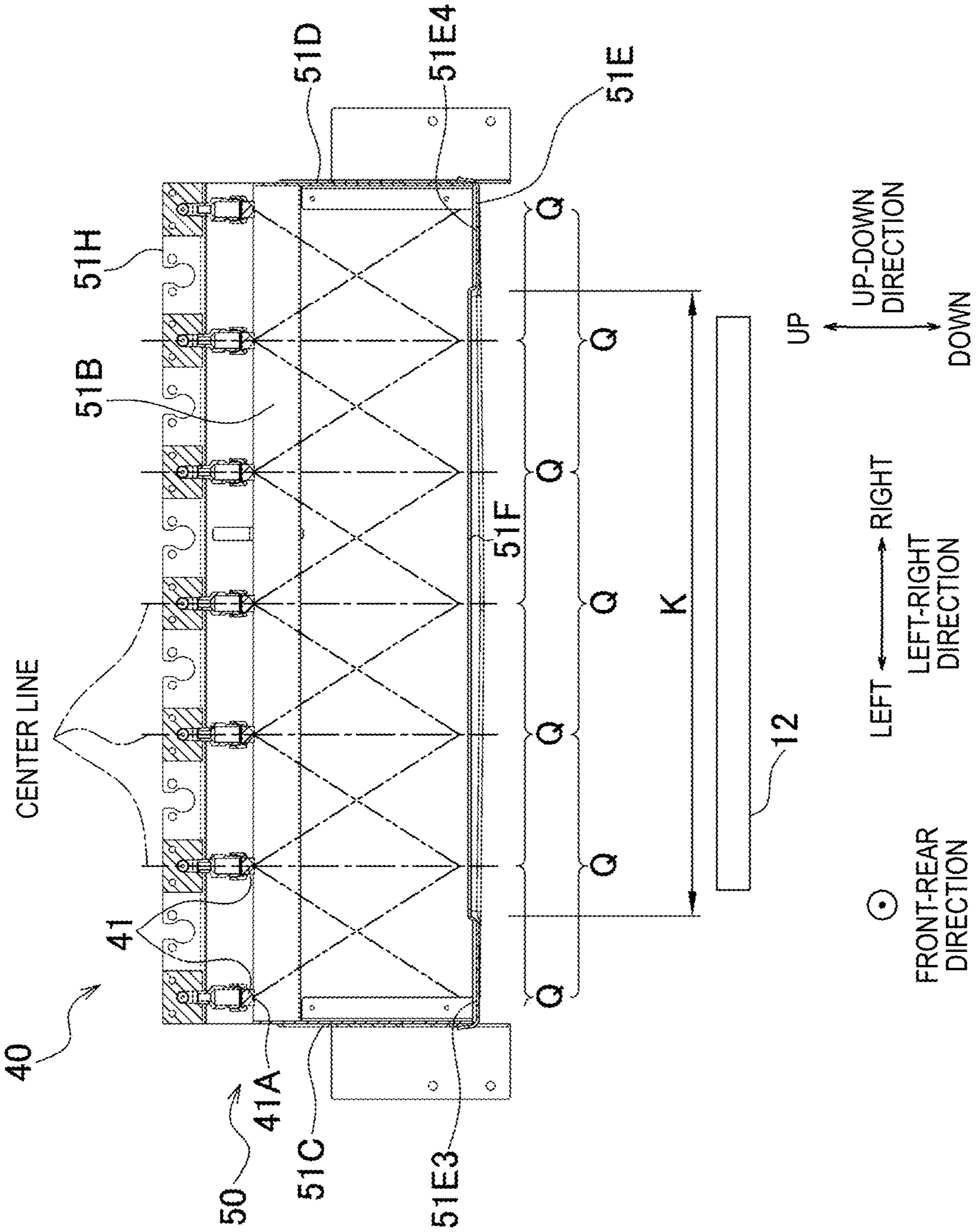
FIG. 7 is a cross-sectional view taken along a line VII-VII illustrated in FIG. 6.

As illustrated in FIG. 6, the ejector device 40 includes seven spray nozzles 41 arranged side by side in the left-right direction. In addition, the ejector device 40 includes a tank (not illustrated) that stores the treatment liquid, a pump 43 (see FIG. 9) that supplies the treatment liquid in the tank to each spray nozzle 41, and a pipe (not illustrated) that connects the tank and each spray nozzle 41. As illustrated in FIG. 7, the spray nozzle 41 has an ejection port 41A on a lower surface thereof. In addition, the spray nozzle 41 is configured to be capable of ejecting the treatment liquid in the form of mist downward from the ejection port 41A.

In such a configuration, when the controller 80 drives the pump 43, the treatment liquid in the tank is supplied to each spray nozzle 41 via the pipe. The treatment liquid supplied to the spray nozzle 41 spreads in a fan shape from the spray nozzle 41 and is ejected in the form of mist. Accordingly, the treatment liquid can be applied to the printing medium.

As illustrated in FIGS. 6 and 7, the ejector device 40 further includes a tubular member 50. The tubular member 50 includes a front plate 51A, a rear plate 51B, a left plate 51C, a right plate 51D, and a bottom plate 51E. The tubular member 50 is disposed between the spray nozzle 41 and the platen 12 in the up-down direction.

As illustrated in FIG. 6, the front plate 51A extends in the up-down and left-right directions and is formed in an elongated shape in the left-right direction. As illustrated in FIGS. 6 and 7, the rear plate 51B is disposed separately from the front plate 51A while facing the front plate 51A in the front-rear direction. The rear plate 51B extends in the up-down and left-right directions and is formed in an elongated shape in the left-right direction.

As illustrated in FIGS. 6 and 7, the left plate 51C extends in the up-down and front-rear directions and is formed in an elongated shape in the up-down direction. The right plate 51D is disposed separately from the left plate 51C while facing the left plate 51C in the left-right direction. The right plate 51D extends in the up-down and front-rear directions and is formed in an elongated shape in the up-down direction. The bottom plate 51E extends in the front-rear and left-right directions and is formed in an elongated shape in the left-right direction. The bottom plate 51E having a later-described through port 51F formed therein is connected to a lower end of a tubular body formed by connecting the four plates 51A to 51D in the front-rear and left-right directions, thereby forming the tubular member 50 that opens at the top and bottom.

Figure 8:
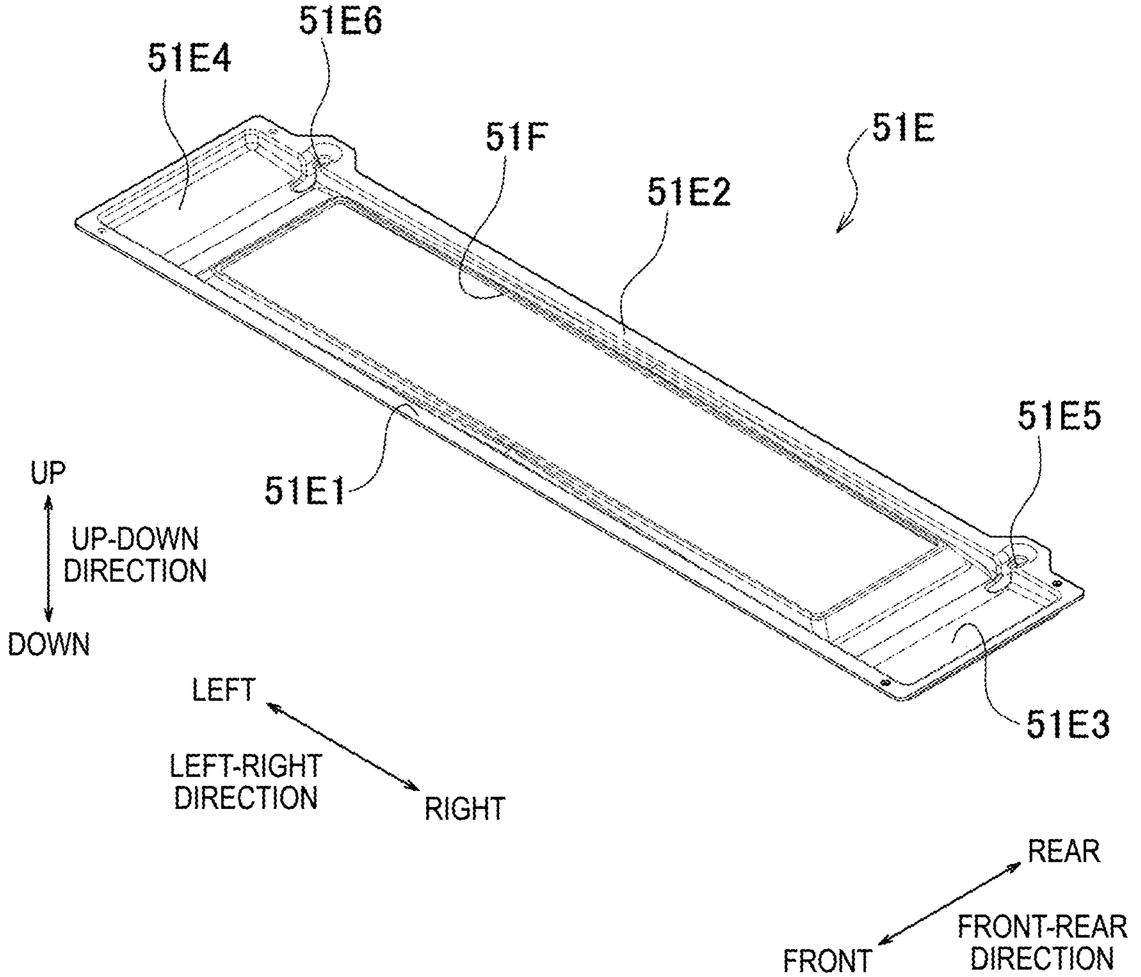
FIG. 8 is a perspective view of a bottom plate of the ejector device illustrated in FIG. 6.

As illustrated in FIG. 8, the through port 51F penetrating in the up-down direction is formed in a center portion of the bottom plate 51E. The through port 51F extends in an elongated shape in the left-right direction, and is formed such that a front edge portion 51E1, a rear edge portion 51E2, a right end portion 51E3, and a left end portion 51E4 remain in the bottom plate 51E. Discharge ports 51E5 and 51E6 that penetrate in the up-down direction are formed in rear end portions of the right end portion 51E3 and the left end portion 51E4. The discharge ports 51E5 and 51E6 discharge the treatment liquid received by the bottom plate 51E downward. Receiving portions 55 and 56 to be described later are disposed below the discharge ports 51E5 and 51E6, and the discharged treatment liquid is received by the receiving portions 55 and 56.

Here, the seven spray nozzles 41 will be described with reference to FIG. 7. The seven spray nozzles 41 in the present embodiment are supported by a support plate 51H fixed to an upper portion of the rear plate 51B of the tubular member 50. The seven spray nozzles 41 are arranged side by side at equal intervals along the left-right direction. Further, the seven spray nozzles 41 are disposed at positions where centers of the ejection ports 41A overlap with a center line extending in the left-right direction passing through a center of the through port 51F in the front-rear direction in the up-down direction.

The seven spray nozzles 41 have the same configuration. As illustrated in FIG. 7, the spray nozzle 41 is configured such that the treatment liquid ejected from the ejection port 41A spreads in a fan shape mainly in the left-right direction as the treatment liquid flows downward from the ejection port 41A. Specifically, each spray nozzle 41 is configured to eject the treatment liquid at least to an entire ejection range Q in the left-right direction. The ejection range Q of each spray nozzle 41 in the present embodiment is a range between center lines passing through centers of two spray nozzles 41 adjacent to one spray nozzle 41 on both left and right sides of the one spray nozzle 41. The ejection range Q is an approximate range in which the treatment liquid ejected from each spray nozzle 41 spreads, and the treatment liquid ejected from each spray nozzle 41 may exceed the ejection range Q. Further, the ejection range Q may be a range inward of the center line passing through the centers of the two spray nozzles 41 adjacent to the one spray nozzle 41 on the both left and right sides of the one spray nozzles 41.

As illustrated in FIG. 7, the seven spray nozzles 41 are arranged such that the ejection ranges Q of the adjacent spray nozzles 41 overlap each other in the left-right direction. The treatment liquid ejected from the ejection port 41A of each spray nozzle 41 spreads also in the front-rear direction as the treatment liquid flows downward from the ejection port 41A.

In addition, as illustrated in FIG. 7, among the seven spray nozzles 41, two spray nozzles 41 located on the outermost sides in the left-right direction are disposed at positions facing the right end portion 51E3 and the left end portion 51E4 in the up-down direction. The remaining five spray nozzles 41 are disposed at positions facing the through port 51F in the up-down direction.

In the present embodiment, when the treatment liquid is ejected from the seven spray nozzles 41, the treatment liquid is ejected toward the platen 12 in substantially the same range as an opening range of the through port 51F. That is, the treatment liquid ejection region P4 is substantially equal to the opening range of the through port 51F. As illustrated in FIG. 7, a width K of the through port 51F in the left-right direction is slightly larger than a width of the platen 12 in the left-right direction. In this manner, the ejector device 40 can eject the treatment liquid over the entire left-right direction of the platen 12. Among the treatment liquids ejected from the seven spray nozzles 41, the treatment liquid not passing through the through port 51F is received by the bottom plate 51E. The treatment liquid received by the bottom plate 51E is discharged downward through the discharge ports 51E5 and 51E6.

As illustrated in FIGS. 1 and 3, the two receiving portions 55 and 56 are fixed to the cover 8A that covers the ejector device 40. Each of the receiving portions 55 and 56 has a recess portion that opens upward. The receiving portion 55 is fixed to the cover 8A by a fixing plate 57, and the receiving portion 56 is fixed to the cover 8A by a fixing plate 58.

The two receiving portions 55 and 56 are disposed on an outer side with respect to the pair of partition plates 37C in the left-right direction. In addition, the two receiving portions 55 and 56 are disposed between the platen 12 and the tray 37A in the up-down direction. Further, the receiving portion 55 is disposed to face the right end portion 51E3 of the bottom plate 51E in the up-down direction, and the receiving portion 56 is disposed to face the left end portion 51E4 of the bottom plate 51E in the up-down direction. Through holes (not illustrated) penetrating in the up-down direction are formed in bottom portions of the respective receiving portions 55 and 56. The through hole of the receiving portion 55 is disposed at a position facing the waste liquid groove 46 (to be described later) in the up-down direction. The through hole of the receiving portion 56 is disposed at a position facing the waste liquid groove 47 (to be described later) in the up-down direction.

As illustrated in FIG. 3, the printing device 1 includes two guide gutters 44 and 45, the two waste liquid grooves 46 and 47, a pipe 48, and a waste liquid tank 49. The two guide gutters 44 and 45, the two waste liquid grooves 46 and 47, and the pipe 48 constitute a waste liquid flow path. The waste liquid flow path may constitute a flow path connecting from one of the receiving portions 55 and 56 to the waste liquid tank 49. That is, in a case where a tube connecting the through holes of the receiving portions 55 and 56 and the waste liquid tank 49 is provided, the tube constitutes the waste liquid flow path.

The guide gutter 44 has a recess portion that is open forward and obliquely upward, and is disposed below the through hole of the receiving portion 55. The recess portion of the guide gutter 44 communicates with the recess portion of the receiving portion 55 via the through hole, and guides the treatment liquid discharged from the receiving portion 55 to the waste liquid groove 46. The guide gutter 45 also has a recess portion that is open forward and obliquely upward, and is disposed below the through hole of the receiving portion 56. The recess portion of the guide gutter 45 communicates with the recess portion of the receiving portion 56 via the through hole, and guides the treatment liquid discharged from the receiving portion 56 to the waste liquid groove 47.

The waste liquid groove 46 is open upward, is disposed adjacent to a right end of the support base 36, and extends along the front-rear direction. In addition, the waste liquid groove 46 is disposed at a position overlapping the through hole of the receiving portion 55 and the guide gutter 44 in the up-down direction, and receives the treatment liquid from the receiving portion 55.

The waste liquid groove 47 is also open upward, is disposed adjacent to a left end of the support base 36, and extends along the front-rear direction. In addition, the waste liquid groove 47 is disposed at a position overlapping the through hole of the receiving portion 56 and the guide gutter 45 in the up-down direction, and receives the treatment liquid from the receiving portion 56. The waste liquid grooves 46 and 47 also receive a waste liquid (for example, water droplets caused by dew condensation) generated in the housing 8.

As illustrated in FIG. 3, the pipe 48 connects the two waste liquid grooves 46 and 47 to the waste liquid tank 49. Accordingly, the waste liquid (including the treatment liquid) in the waste liquid grooves 46 and 47 flows to the waste liquid tank 49 via the pipe 48.

An electrical configuration of the printing device 1 will be described with reference to FIG. 9. The controller 80 includes a CPU 81, a ROM 82, a RAM 83, and a flash memory 84. The CPU 81 controls the printing device 1 and is electrically connected to the ROM 82, the RAM 83, and the flash memory 84. The ROM 82 stores a control program for the CPU 81 to control an operation of the printing device 1, information necessary for the CPU 81 to execute various programs, and the like. The ROM 82 stores, for example, each position of the carriage 6 (head 30) based on a rotation angle of the main scanning motor 7M, and stores each position of the platen 12 based on a rotation angle of the sub scanning motor 26. The RAM 83 temporarily stores various types of data used in the control program, and the like. The flash memory 84 is nonvolatile and stores print data and the like for printing.

Figure 9:
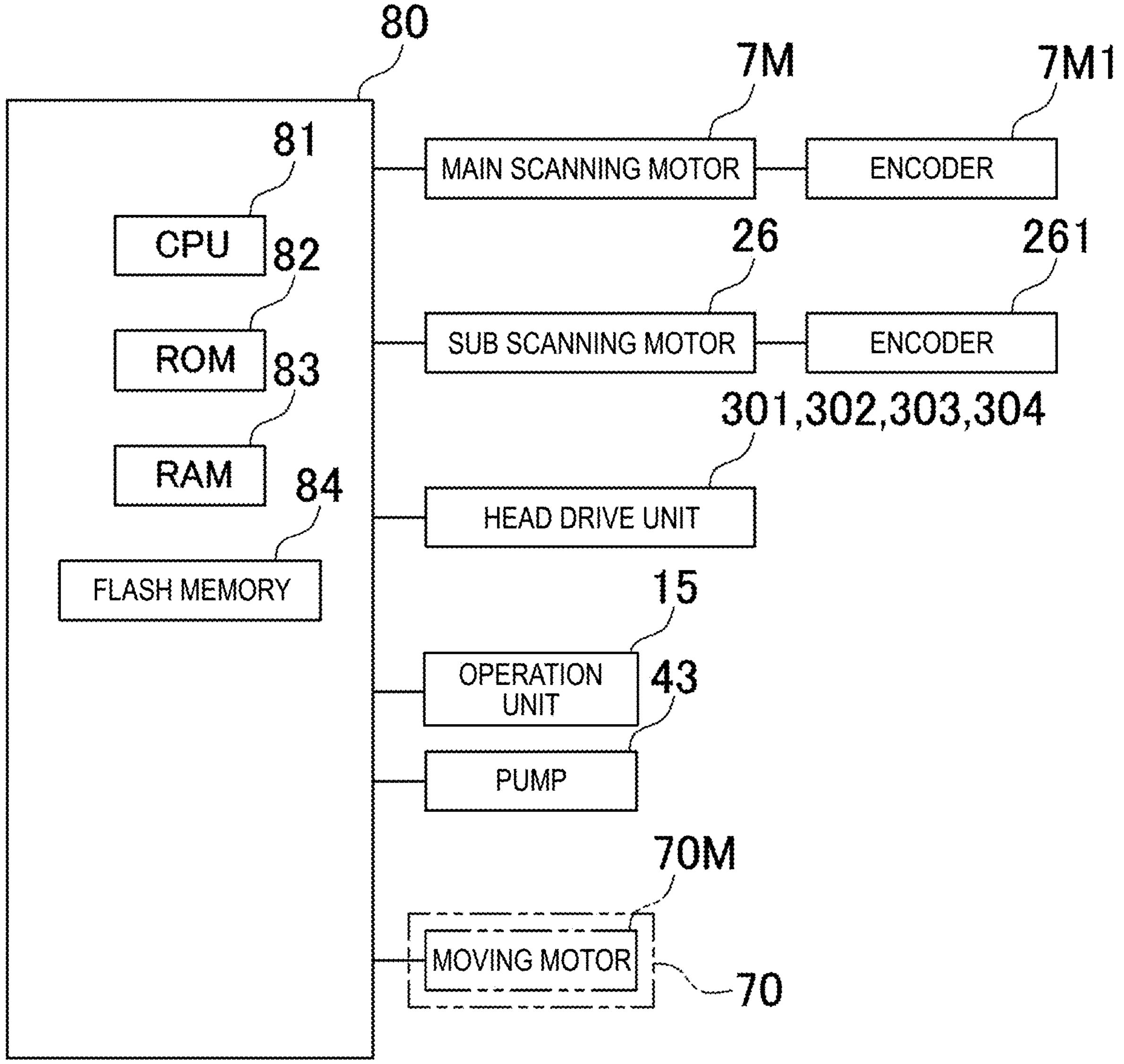
FIG. 9 is a block view illustrating an electrical configuration of the printing device illustrated in FIG. 1.

As illustrated in FIG. 9, the main scanning motor 7M, the sub scanning motor 26, four head drive units 301 to 304, the operation unit 15, and the pump 43 are electrically connected to the controller 80. The main scanning motor 7M, the sub scanning motor 26, the head drive units 301 to 304, and the pump 43 are driven under control of the controller 80.

The main scanning motor 7M and the sub scanning motor 26 are provided with encoders 7M1 and 261, respectively. The encoder 7M1 detects the rotation angle of the main scanning motor 7M and outputs a detection result to the controller 80. The encoder 261 detects the rotation angle of the sub scanning motor 26 and outputs a detection result to the controller 80.

The four head drive units 301 to 304 correspond to the white heads 31 and 32 and the color heads 33 and 34 in this order, and are included in the heads 31 to 34. Each of the head drive units 301 to 304 is implemented by a plurality of drive elements (piezoelectric elements or heat generating elements) capable of selectively applying energy to ink in a plurality of individual flow paths respectively communicating with the plurality of nozzles of the head 30. The head drive units 301 to 304 respectively apply energy to the ink in the white heads 31 and 32 and the color heads 33 and 34 by driving the white heads 31 and 32 and the color heads 33 and 34, and thus the ink is selectively ejected from the corresponding nozzles 313, 323, 333, and 343.

<Control During Printing>

Figure 10:
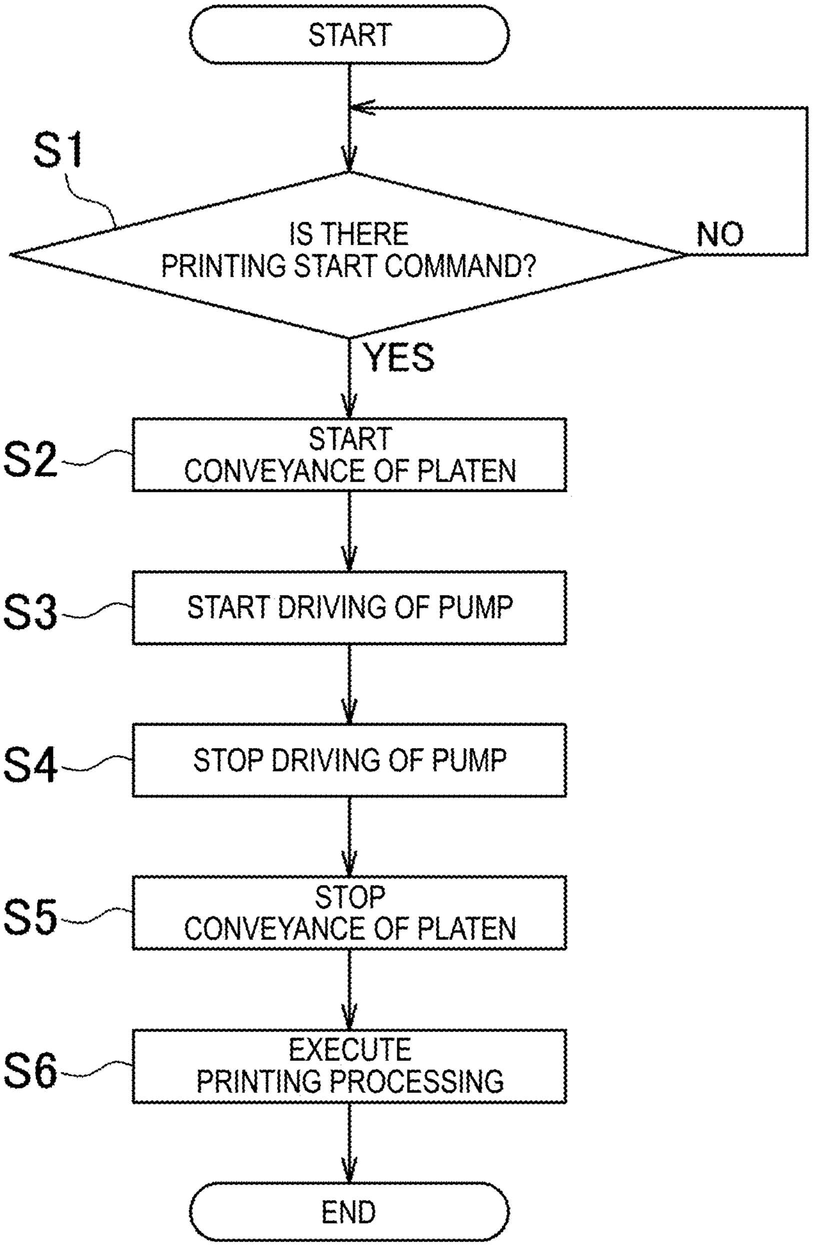
FIG. 10 is a flowchart illustrating an example of a processing procedure executed when a printing start command is input to the printing device illustrated in FIG. 1.

The control by the controller 80 when printing an image on the printing medium will be described with reference to FIG. 10. When the user operates the operation unit 15 and inputs the printing start command to the printing device 1, the controller 80 reads a control program from the ROM 82 and operates to execute a flow of FIG. 10. Hereinafter, the flow of FIG. 10 will be described.

First, the controller 80 determines whether the printing start command is input (S1). Before operating the operation unit 15 to input a print start instruction, the user disposes a printing medium (T-shirt) to which the treatment liquid is not applied on the support surface 12A of the platen 12. In this case, hung down portions of the printing medium from both ends in the left-right direction of the platen 12 are disposed between the inner surfaces 37C1 of the pair of partition plates 37C as indicated by a two-dot chain line in FIG. 3. The platen 12 is disposed at the set position P1 during non-printing. In the printing device 1, during non-printing, the head 30 is normally disposed at the maintenance position B1, and capping of covering the plurality of nozzles of the head 30 is executed by a cap of a maintenance unit (not illustrated).

In a case where the printing start instruction is not input (NO in S1), S1 is repeated until the printing start instruction is input. On the other hand, in a case where the print start instruction is input (YES in S1), as illustrated in FIG. 11A, the controller 80 controls the sub scanning motor 26 to start the conveyance of the platen 12 from the set position P1 toward the treatment liquid ejection region P4 (S2). The platen 12 moves as the platen support portion 37 moves. The platen support portion 37 includes a tray 37A, and the hung down portion of the printing medium set on the platen 12 is disposed between the platen 12 and the tray 37A and between the pair of partition plates 37C. Therefore, when the configuration is such that only the platen 12 moves, there is a risk that the hung down portion of the printing medium may rub against members other than the platen 12, but in the present embodiment, since the tray 37A and the partition plate 37C also move together with the platen 12, it is possible to prevent occurrence of rubbing against the hung down portion of the printing medium.

Next, the controller 80 starts driving of the pump 43 (S3). Accordingly, the treatment liquid is supplied from the tank that stores the treatment liquid to each spray nozzle 41 via the pipe, and the treatment liquid is ejected in the form of mist from each spray nozzle 41. Therefore, the treatment liquid ejected in the form of mist is applied to the printing medium supported by the platen 12 passing through the treatment liquid ejection region P4. As a result, an underlay on which the treatment liquid is applied substantially uniformly is formed on the printing medium.

As illustrated in FIG. 3, of the treatment liquid ejected from the through port 51F of the ejector device 40, most of the treatment liquid ejected to an outer side with respect to the platen 12 in the left-right direction is received by the two receiving portions 55 and 56. In addition, in this case, of the treatment liquid ejected from the spray nozzle 41, the treatment liquid received by the bottom plate 51E is discharged from the discharge ports 51E5 and 51E6 to the receiving portions 55 and 56. The treatment liquid received by the receiving portions 55 and 56 flows into the waste liquid grooves 46 and 47 via the guide gutters 44 and 45. The waste liquid in the waste liquid grooves 46 and 47 flows to the waste liquid tank 49 via the pipe 48.

Of the treatment liquid ejected to the outer side with respect to the platen 12 in the left-right direction, the treatment liquid that cannot be received by the two receiving portions 55 and 56 is received by the tray 37A. More specifically, the treatment liquid is received by an outer portion of the bottom plate 37A1 in the left-right direction with respect to the pair of partition plates 37C. Since the upper surface 37A6 of the bottom plate 37A1 has the two inclined surfaces 37A7 and 37A8, the treatment liquid received by the bottom plate 37A1 flows to both ends in the left-right direction of the bottom plate 37A1. For some reason, even when the treatment liquid temporarily adheres to the inclined surface 37A8 between the pair of partition plates 37C of the bottom plate 37A1 as indicated by a two-dot chain line in FIG. 4, the treatment liquid flows along an inclination of the inclined surface 37A8 and flows to the left end of the bottom plate 37A1 through the penetration portion 37C4. The treatment liquid received by the bottom plate 37A1 of the tray 37A is discharged to the waste liquid grooves 46 and 47 through a discharge port (not illustrated) and a pipe formed in the tray 37A. Thus, the treatment liquid received by the tray 37A also finally flows to the waste liquid tank 49.

Figure 11B:
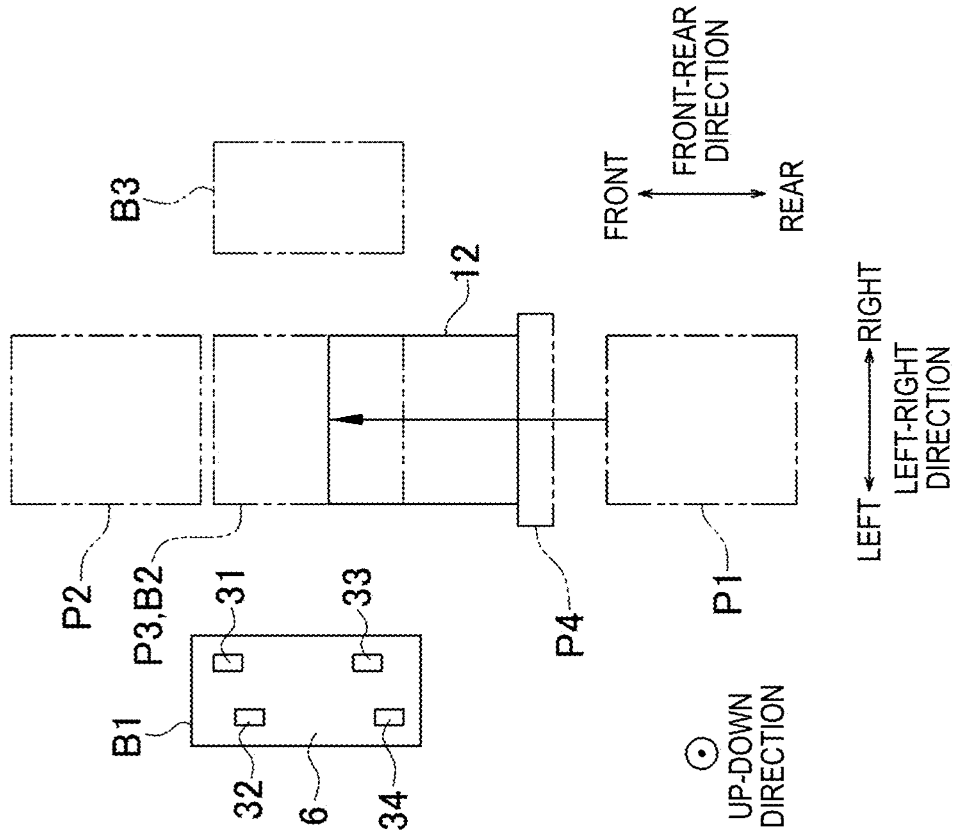
FIG. 11B is a view illustrating a situation in which the platen has passed through the treatment liquid ejection region.
Figure 11A:
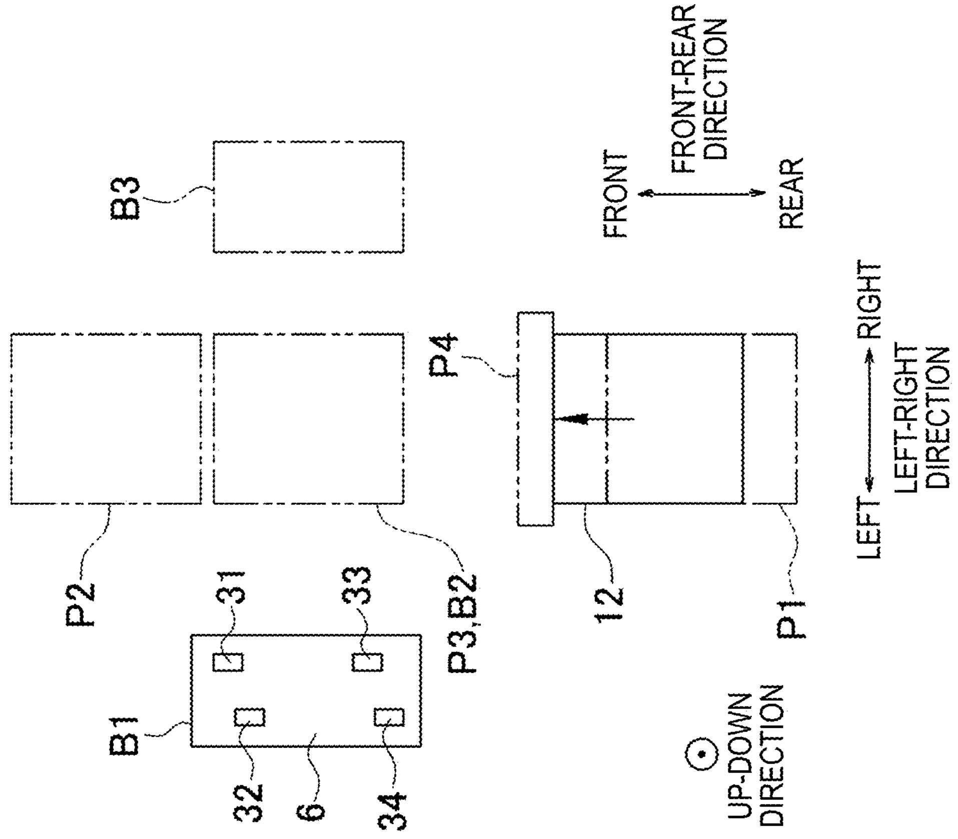
FIG. 11A is a view illustrating a situation in which a platen has reached a treatment liquid ejection region from a set position.

Next, as illustrated in FIG. 11B, the controller 80 stops the driving of the pump 43 at a timing when the platen 12 passes through the treatment liquid ejection region P4 (S4). Accordingly, the supply of the treatment liquid to each spray nozzle 41 is stopped, and the ejection of the treatment liquid from each spray nozzle 41 is stopped. In the present embodiment, the treatment liquid is controlled so as to be ejected onto the entire support surface 12A of the platen 12, whereby the treatment liquid is controlled so as to be applied onto the entire surface of the printing medium, but the treatment liquid may be applied to only a portion of the printing medium in the front-rear direction by appropriately changing a driving timing of the pump 43. In addition, in a case where the treatment liquid is applied only to a portion of the printing medium, the treatment liquid may be applied only to a region corresponding to an image range formed by ejecting ink onto the printing medium.

Next, the controller 80 controls, based on a detection result from the encoder 261, the sub scanning motor 26 to stop conveyance of the platen when the platen 12 reaches the pre-printing standby position P2 (S5).

Next, the controller 80 executes a printing processing of printing an image on the printing medium (S6). The controller 80 controls the sub scanning motor 26 based on a detection result from the encoder 261 to move the platen 12 from the pre-printing standby position P2 to the printing conveyance region P3.

Then, the controller 80 controls the main scanning motor 7M based on a detection result from the encoder 7M1 to move the carriage 6 from the maintenance position B1 to the ejection region B2 and cause the head 30 to face the printing medium placed on the platen 12.

The controller 80 controls the head drive units 301 to 304, the main scanning motor 7M, and the sub scanning motor 26, and executes printing on the printing medium by alternately repeating the ejection scanning and forward moving of the platen 12, in a state where at least a part of the platen 12 is located in the printing conveyance region P3 and in a state where the carriage 6 is located in the ejection region B2. That is, at the time of the printing on the printing medium, since the platen 12 is conveyed forward from the pre-printing standby position P2 to the printing conveyance region P3, first, the white ink is ejected from the nozzles of the white heads 31 and 32 onto the underlay on the printing medium formed by applying the treatment liquid thereon, and an underlay (mainly for color ink) is formed. Then, after the platen 12 passes through the white heads 31 and 32, the ink is ejected from the nozzles of the color heads 33 and 34 onto the underlay formed on the printing medium, and an image is formed. A portion representing white of the image is an underlaid portion formed with white ink. Therefore, the color ink is not ejected onto the underlaid portion.

Next, when the printing on the printing medium based on the print data is completed (printing processing is completed), the controller 80 controls the sub scanning motor 26 based on a detection result from the encoder 261 to stop the platen 12 at the set position P1. The user removes the printing medium on which the image is formed from the platen 12 disposed at the set position P1. In this case, the controller 80 controls the main scanning motor 7M based on a detection result from the encoder 7M1 to move the carriage 6 leftward from the ejection region B2 and stop the carriage 6 at the maintenance position B1. In this manner, the flow of FIG. 10 ends.

As described above, according to the printing device 1 of the present embodiment, since the inner surfaces 37C1 of the pair of partition plates 37C are located between both ends of the platen 12, a space between the pair of partition plates 37C is located immediately below the platen 12, and is a region to which the treatment liquid ejected from the ejector device 40 is less likely to adhere. By disposing the portions hanging down from the both ends of the platen 12 of the printing medium in this region, the treatment liquid adhering to the outer portion of the bottom plate 37A1 with respect to the both ends of the platen 12 in the left-right direction can be prevented from adhering to the portions. That is, contamination of the hung down portion of the printing medium can be prevented. The treatment liquid adhering to the bottom plate 37A1 is highly likely to contain impurities such as dust and ink mist. In addition, in the treatment liquid adhering to the bottom plate 37A1, moisture thereof evaporates with the elapse of time, and a component ratio thereof also changes from a desired component ratio. Such a treatment liquid that is highly likely to contain impurities and is different from the desired component ratio can be prevented from adhering to the hung down portion of the printing medium.

The upper surface 37A6 of the bottom plate 37A1 has the inclined surfaces 37A7 and 37A8. Accordingly, it is possible to cause the treatment liquid adhering to the upper surface 37A6 of the bottom plate 37A1 to flow toward both ends (outer edges) in the left-right direction of the bottom plate 37A1. Even when the treatment liquid temporarily adheres between the pair of partition plates 37C of the bottom plate 37A1, the treatment liquid can flow toward the both ends (outer edges) in the left-right direction of the bottom plate 37A1. That is, the treatment liquid adhering between the pair of partition plates 37C of the bottom plate 37A1 flows toward the pair of partition plates 37C along the inclined surfaces 37A7 and 37A8. Thereafter, the treatment liquid flows from at least one of end portions of the partition plates 37C in the front-rear direction toward the both ends (outer edges) in the left-right direction of the bottom plate 37A1. Accordingly, the treatment liquid adhering to the bottom plate 37A1 can be further prevented from adhering to the hung down portion of the printing medium.

As a modification, the upper surface 37A6 of the bottom plate 37A1 may have at least any of a front inclined surface inclined downward from the center toward the front end and a rear inclined surface inclined downward from the center toward the rear end in the front-rear direction. Also in this case, similarly to the inclined surfaces 37A7 and 37A8 described above, the treatment liquid adhering to the upper surface 37A6 of the bottom plate 37A1 can flow toward the ends (outer edges) of the bottom plate 37A1 in the front-rear direction, and the same effect can be obtained.

Figure 5B:
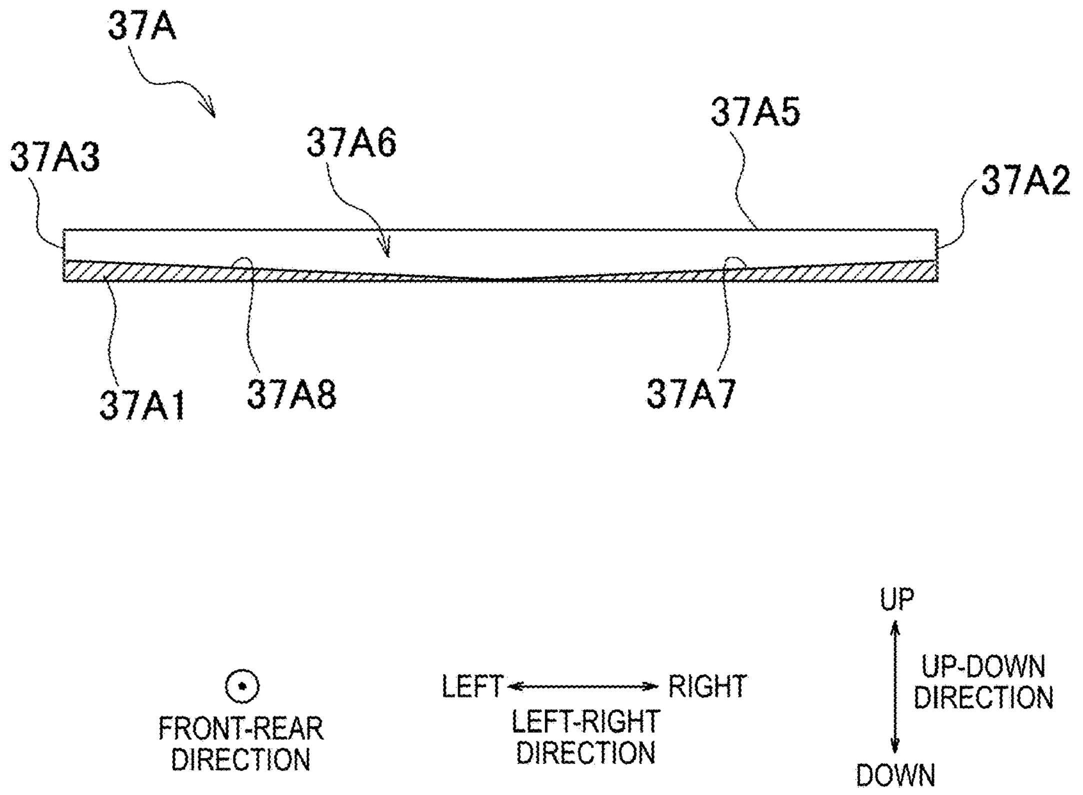
FIG. 5B is a cross-sectional view of the tray according to a modification.

As another modification, the inclined surfaces 37A7 and 37A8 in the embodiment described above and the inclined surface in the modification may be inclined reversely. That is, as shown in FIG. 5B, the inclined surfaces 37A7 and 37A8 may be inclined downward from the outer edge toward the center of the bottom plate 37A1. In this case, the treatment liquid adhering to the bottom plate 37A1 gathers at the center of the bottom plate 37A1. Also in this case, the treatment liquid adhering to the bottom plate 37A1 can be further prevented from adhering to the hung down portion of the printing medium. In addition, by providing a discharge port at the center of the bottom plate 37A1, the treatment liquid adhering to the bottom plate 37A1 can be discharged.

A portion of the upper surface 37A6 may be inclined downward toward the center or the outer edge of the bottom plate 37A1. Also in this case, the treatment liquid adhering to the bottom plate 37A1 can be prevented from adhering to the hung down portion of the printing medium. For example, the inclined surfaces 37A7 and 37A8 may be formed only on an outer side with respect to the pair of partition plates 37C of the bottom plate 37A1. Accordingly, it is possible to cause the treatment liquid adhering to the outer side with respect to the pair of partition plates 37C of the bottom plate 37A1 to flow to both the left and right ends of the bottom plate 37A1, thereby obtaining the same effect as described above.

The pair of side plates 37A2 and 37A3 are formed at the both ends in the left-right direction of the bottom plate 37A1. Accordingly, the treatment liquid adhering to the upper surface 37A6 of the bottom plate 37A1 can be prevented from dripping down from the left and right ends of the bottom plate 37A1. In addition, the front plate 37A4 and the rear plate 37A5 are also formed at the both ends in the front-rear direction of the bottom plate 37A1. Accordingly, the treatment liquid adhering to the upper surface 37A6 of the bottom plate 37A1 can be prevented from dripping down from the front and rear ends of the bottom plate 37A1.

The partition plate 37C is formed extending upward from the upper surface 37A6 of the bottom plate 37A1. Accordingly, the partition plate 37C can be implemented with a simple configuration.

Since the penetration portion 37C4 is formed in the partition plate 37C, even when the treatment liquid temporarily adheres to a portion on an inner side with respect to the pair of partition plates 37C on the bottom plate 37A1, the treatment liquid can flow toward an outer side of the pair of partition plates 37C through the penetration portion 37C4.

The printing device 1 includes the receiving portions 55 and 56. Accordingly, the treatment liquid is less likely to adhere to the outer portions of the pair of partition plates 37C on the bottom plate 37A1.

The receiving portions 55 and 56 communicate with the guide gutters 44 and 45, the waste liquid grooves 46 and 47, and the pipe 48, which constitute the waste liquid flow path. Accordingly, it is possible to prevent overflow of the treatment liquid from the receiving portions 55 and 56.

Second Embodiment

Figure 12:
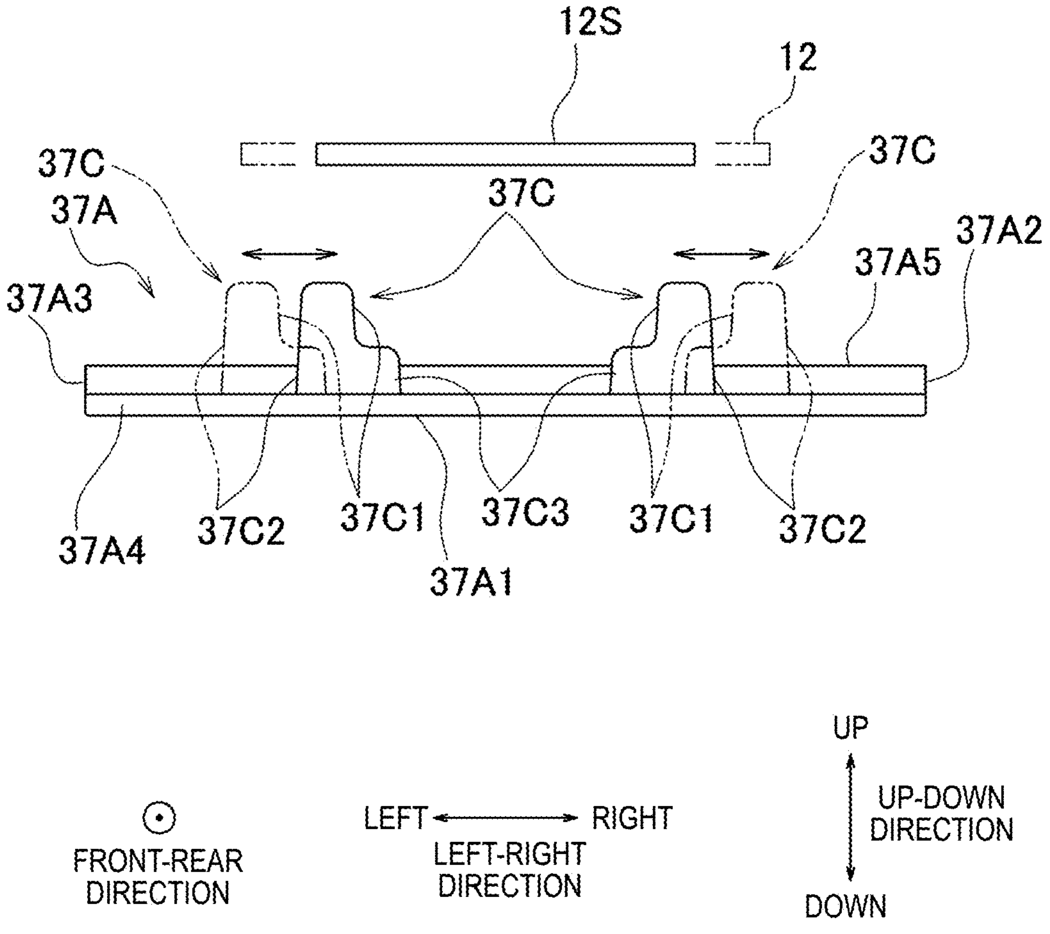
FIG. 12 is a schematic configuration view of a pair of partition plates, a tray, and a platen of a printing device according to a second embodiment of the present disclosure.

A printing device according to the second embodiment of the present disclosure will be described with reference to FIG. 12. The printing device according to the present embodiment includes a moving mechanism 70 (indicated by a two-dot chain line in FIG. 9) capable of moving the pair of partition plates 37C. That is, the pair of partition plates 37C in the first embodiment is fixed to the bottom plate 37A1, but may be configured to be movable as illustrated in FIG. 12. The same components as those of the first embodiment are denoted by the same reference numerals, and the description thereof is omitted.

As illustrated in FIG. 12, the moving mechanism 70 moves the pair of partition plates 37C between a first position and a second position. As illustrated in FIG. 9, the moving mechanism 70 includes a moving motor 70M. In addition, the moving mechanism 70 includes a power transmission mechanism (not illustrated) that transmits power of the moving motor 70M and moves the pair of partition plates 37C along the left-right direction. As the power transmission mechanism, for example, a known transmission mechanism such as a rack and a pinion is adopted.

In FIG. 12, a platen 12S is a platen having a smaller width size in the left-right direction than that of the platen 12 (indicated by two-dot chain lines in FIG. 12). The first position refers to disposition positions of the pair of partition plates 37C indicated by two-dot chain lines in FIG. 12, and refers to disposition positions when the platen support portion 37 supports the platen 12. That is, the first position refers to the same position as the pair of partition plates 37C of the first embodiment. The second position refers to disposition positions of the pair of partition plates 37C indicated by solid lines in FIG. 12. In addition, the second position refers to disposition positions of the pair of partition plates 37C when the platen support portion 37 supports the platen 12S, and refers to positions at which the pair of partition plates 37C is disposed further inward in the left-right direction than when the pair of partition plates 37C is disposed at the first position. Further, the second position refers to positions at which the inner surfaces 37C1 of the pair of partition plates 37C are disposed on an inner side in the left-right direction with respect to both ends in the left-right direction of the platen 12S.

<Control During Printing>

Figure 13:
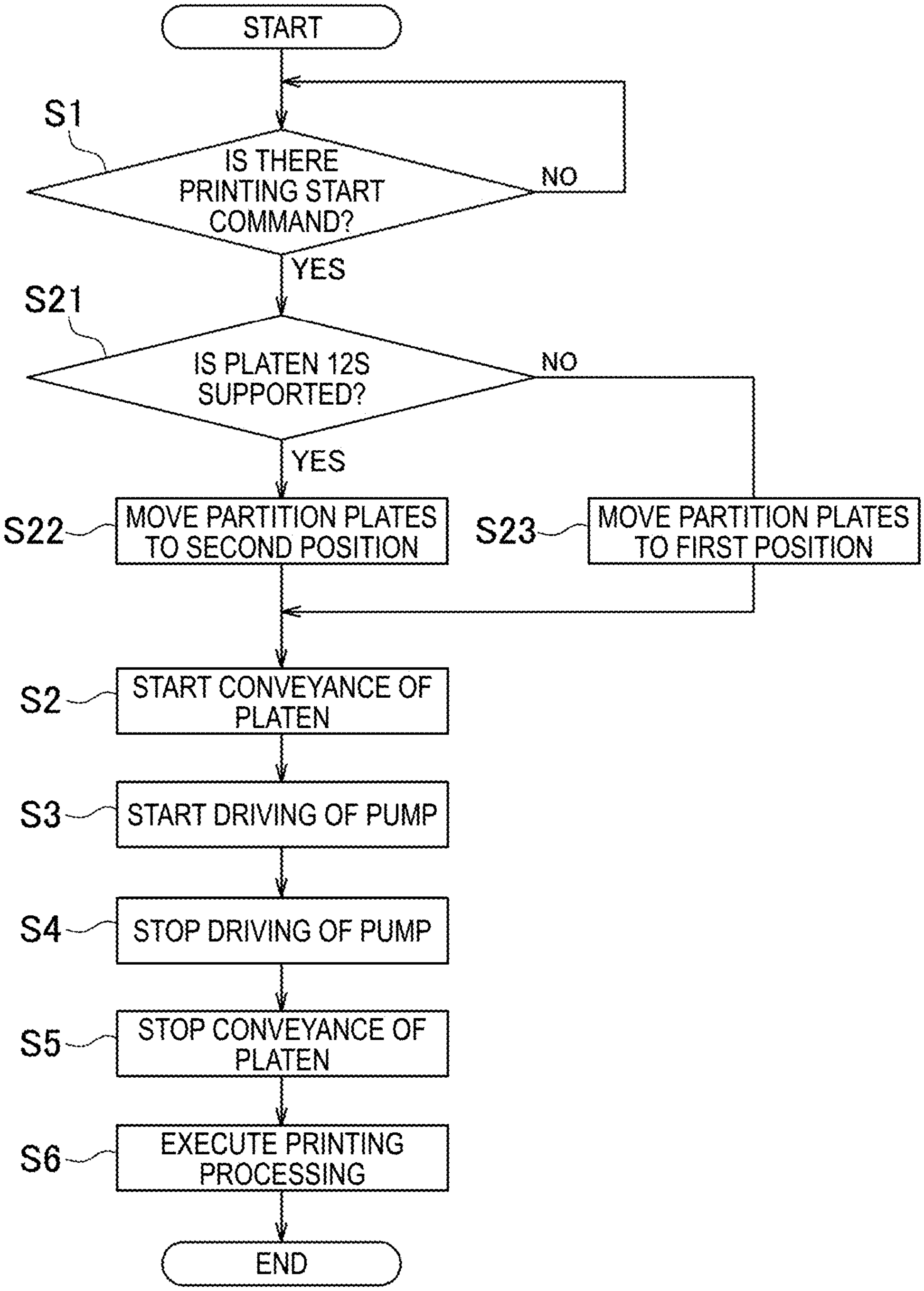
FIG. 13 is a flowchart illustrating an example of a processing procedure executed when a printing start command is input to the printing device illustrated in FIG. 12.

The control by the controller 80 when printing an image on the printing medium will be described with reference to FIG. 13. When the user inputs a type of a platen to be used at the time of printing and a printing start command to the printing device 1 by the operation unit 15 and an input unit (for example, an input key provided below a display unit 16), the controller 80 reads a control program from the ROM 82 and operates to execute the flow of FIG. 13. The type of the platen in the present embodiment is any of the platen 12 and the platen 12S, and the controller 80 acquires platen data (an example of a "support portion data") by inputting the type of the platen to be used in current printing from the input unit. The platen data in the present embodiment is data indicating a width size of the platen 12 or the platen 12S in the left-right direction, and is input by the input unit, but a sensor that detects the width size of the platen may be provided in the printing device. Then, the controller 80 may acquire the platen data by acquiring a detection signal from the sensor. In addition, in a case where a size of the platen is included as meta data in the print data, the controller 80 may acquire the platen data by acquiring the print data. Hereinafter, the flow of FIG. 13 will be described.

The controller 80 executes the same processing as that in S1 described above. In a case where the printing start instruction is not input (NO in S1), S1 is repeated until the printing start instruction is input. On the other hand, in a case where the print start instruction is input (YES in S1), the controller 80 determines whether the platen supported by the platen support portion 37 is the platen 12S based on the platen data (S21).

In a case where the platen supported by the platen support portion 37 is the platen 12S (YES in S21), the controller 80 controls the moving motor 70M such that the pair of partition plates 37C is disposed at the second position (S22). Accordingly, the pair of partition plates 37C is disposed at the second position even in a case where the platen 12S is used as the platen. In this case, when the user places the printing medium (T-shirt) to which no treatment liquid has been applied on the platen 12S, the user disposes the hung down portion between the inner surfaces 37C1 of the pair of partition plates 37C.

On the other hand, in a case where the platen supported by the platen support portion 37 is not the platen 12S (NO in S21), the controller 80 determines that the platen 12 is supported, and controls the moving motor 70M such that the pair of partition plates 37C is disposed at the first position (S23). In this case, when the user places the printing medium (T-shirt) to which no treatment liquid has been applied on the platen 12, the user disposes the hung down portion between the inner surfaces 37C1 of the pair of partition plates 37C.

In this manner, by moving the pair of partition plates 37C according to the width size of the platen in the left-right direction, the hung down portion of the printing medium can be disposed immediately below the platen.

Next, the controller 80 executes the above-described S2 to S6 in order. The process of S2 in the present embodiment is executed by the user inputting a signal indicating a start of conveyance of the platen by the operation unit 15. Then, when the printing on the printing medium based on the print data is completed (printing processing is completed), the controller 80 controls the sub scanning motor 26 based on a detection result from the encoder 261 to stop the platen 12 at the set position P1. The user removes the printing medium on which the image is formed from the platen 12 or the platen 12S disposed at the set position P1. In this case, the controller 80 controls the main scanning motor 7M based on a detection result from the encoder 7M1 to move the carriage 6 leftward from the ejection region B2 and stop the carriage 6 at the maintenance position B1. In this manner, the flow of FIG. 13 ends.

As described above, also in the printing device 1 of the present embodiment, similarly to the first embodiment, the space between the pair of partition plates 37C is immediately below the platen 12 or the platen 12S, and is a region to which the treatment liquid ejected from the ejector device 40 is less likely to adhere. By disposing the portions hanging down from the both ends of the platen 12 or the platen 12S of the printing medium in this region, the treatment liquid adhering to the outer portion of the bottom plate 37A1 with respect to the both ends of the platen 12 or the platen 12S in the left-right direction can be prevented from adhering to the portions. That is, contamination of the hung down portion of the printing medium can be prevented.

The controller 80 controls the moving mechanism 70 such that the pair of partition plates 37C is disposed at any of the first position and the second position based on the platen data. Accordingly, a configuration can be realized in which the inner surfaces 37C1 of the pair of partition plates 37C are located between the both ends in the left-right direction of the platen 12 or the platen 12S without a manual operation of the user.

As a modification, the pair of partition plates 37C may be configured to be movable in the left-right direction such that the pair of partition plates 37C can be manually disposed at any of the first position and the second position. Also in this case, even when the width size of the platen 12S in the left-right direction is smaller than a predetermined size (width size of the platen 12), by moving the pair of partition plates 37C in the left-right direction, a configuration can be realized in which the inner surfaces 37C1 of the pair of partition plates 37C are located between the both ends in the left-right direction of the platen 12 or the platen 12S. The pair of partition plates 37C may be configured to be slidable in the left-right direction with respect to the bottom plate 37A1, or may be configured to be detachable with respect to the bottom plate 37A1. In the case where the pair of partition plates 37C is configured to be detachable from the bottom plate 37A1, the pair of partition plates 37C may be reattached from the first position to the second position or from the second position to the first position. Also in this case, the effects as described above can be obtained.

As another modification, only one of the pair of partition plates 37C may be configured to be movable in the left-right direction. For example, even when a platen is used in which one end of the platen in the left-right direction is located closer to or farther from a center line passing through the center of the conveyance path of the platen in the left-right direction than the other end thereof with respect to the center line, a configuration can be realized in which the partition plate 37C is moved in accordance with the platen and the inner surface 37C1 of the partition plate 37C is located between both ends in the left-right direction of the platen. In each of the embodiments described above, the center in the left-right direction of the platen 12 and the center in the left-right direction of the conveyance path of the platen are on the same line in plan view.

As another modification, the controller 80 may estimate a width size of the platen in the left-right direction based on the image data, and control the moving mechanism 70 so as to move at least one of the pair of partition plates 37C in the left-right direction. Also in this case, a configuration can be realized in which the inner surfaces 37C1 of the pair of partition plates 37C are located between the both ends in the left-right direction of the platen, as described above.

Although an embodiment of the present disclosure has been described above, the present disclosure is not limited to the embodiment described above, and various modifications can be made within the scope of the claims.

In each of the embodiments and each of the modifications described above, the pair of partition plates 37C is installed on the bottom plate 37A1, but the pair of partition plates 37C may be disposed separately from the bottom plate 37A1. In this case, the pair of partition plates 37C may be configured to be supported by the housing 8 and extend in the front-rear direction. In addition, the partition plate 37C may not include the protruding portion 37C3. Further, the partition plate 37C may have any cross-sectional shape such as a triangular shape, a square shape, a polygonal shape, a circular shape, and an elliptical shape.

The pair of partition plates 37C may be the same as or shorter than the platen 12 in the front-rear direction. In addition, regarding a portion located between the bottom plate 37A1 of the pair of partition plates 37C and the platen 12 and forward of the center in the front-rear direction, the inner surface 37C1 may be located between the both ends in the left-right direction of the platen 12. That is, in the center or a rear portion in the front-rear direction of the pair of partition plates 37C, the inner surface 37C1 may be located on the outer side with respect to the both ends in the left-right direction of the platen 12. If the inner surfaces 37C1 of front portions of the pair of partition plates 37C are located between the both ends in the left-right direction of the platen 12 as described above, when a T-shirt is set on the platen 12 as the printing medium, an arm portion of the T-shirt can be disposed between the front portions of the pair of partition plates 37C by disposing a neck portion of the T-shirt on a front portion of the platen 12. That is, a portion (arm portion) of the T-shirt hanging down from the platen 12 can be disposed in a region immediately below the platen 12 to which the treatment liquid ejected from the ejector device 40 is less likely to adhere. Therefore, the same effects as those of the above-described embodiment can be obtained.

At least any of the pair of side plates 37A2 and 37A3, the front plate 37A4, and the rear plate 37A5 may not be formed on the bottom plate 37A1.

The receiving portions 55 and 56 may not be provided. In addition, the guide gutters 44 and 45, the waste liquid grooves 46 and 47, and the pipe 48 constituting the waste liquid flow path may not be provided. The penetration portion 37C4 may not be formed in the partition plate 37C.

The ejector device 40 may have any configuration as long as the ejector device 40 can eject the treatment liquid to a region including both ends in the left-right direction of a platen to be used. That is, the ejector device may not be able to eject the treatment liquid to a center region in the left-right direction of the platen and/or a region between the center region and the both ends in the left-right direction of the platen. In addition, the ejector device 40 may have the same configuration as that of the head 30. Further, the ejector device 40 is not limited to the configuration in which the spray nozzle 41 ejects the treatment liquid.

The ejector device 40 in the above-described embodiment includes the seven spray nozzles 41, but may have one to six, eight or more spray nozzles 41.

In addition, the ejector device 40 ejects the treatment liquid forming the underlay from the spray nozzle 41, but may eject the treatment liquid overcoating the image on the printing medium from the spray nozzle 41. That is, the treatment liquid may be ejected onto the printing medium after the ink is ejected onto the printing medium to form the image. In this case, after the printing processing in S6, that is, until the platen 12 reaches the treatment liquid ejection region P4, the same process as S3 may be executed, and then, after the platen 12 passes through the treatment liquid ejection region P4, the same process as S4 may be executed. In this manner, the image on the printing medium can be overcoated (the overlay of the ink can be formed).

The conveyance mechanism 14 may not include the sub scanning motor 26. In this case, the platen 12 may be moved manually. That is, the conveyance mechanism may have a configuration capable of moving the platen 12 between the set position P1 and a passing position where the platen 12 passes through the treatment liquid ejection region P4.

The heads 30 in the embodiments and each of the modifications described above have been described as an example in which the present disclosure is applied to a printing device including a so-called serial head that ejects ink from a plurality of nozzles while moving along the main scanning direction (left-right direction) by the moving mechanism 7, but the present disclosure is not limited thereto. For example, the present disclosure can also be applied to a printing device provided with a line head extending over the entire length of the printing medium (platen 12) in the main scanning direction and disposed so as not to be movable in the ejection region B2.

The platen support portion 37 in the second embodiment may simultaneously support both of the platen 12 and the platen 12S side by side in the front-rear direction. In this case, the pair of partition plates 37C may be disposed at any of the first position and the second position in accordance with the platen to be used for printing. Alternatively, the pair of partition plates 37C may be fixed at the second position. Also in this case, the effects as described above can be obtained.

In addition, in the controller 80 in the embodiments and each of the modifications described above, a microcomputer, application specific integrated circuits (ASIC), a field programmable gate array (FPGA), or the like may be used as a processor instead of the CPU 81. In this case, a main process may be distributed and executed by a plurality of processors. A non-transitory storage medium such as the ROM 82 and the flash memory 84 may be any storage medium capable of storing information regardless of a period during which the information is stored. The non-transitory storage medium may not include a temporary storage medium (for example, a transmitted signal). For example, the control program may be downloaded (that is, transmitted as a transmission signal) from a server connected to a network (not illustrated) and stored in the ROM 82 or the flash memory 84. In this case, the control program may be stored in a non-transitory storage medium such as an HDD provided in the server.

In the embodiments and each of the modifications described above, the volatile component of the treatment liquid contains an organic acid, but the present disclosure is not limited thereto. That is, the volatile component of the treatment liquid may include a component other than the organic acid, which reacts with the ink in the nozzle to cause aggregation or discoloration. In addition, the treatment liquid may not contain a volatile component such as an organic acid.

What is claimed is:

1. A printing device comprising:

a support portion configured to move in a first direction and configured to support a printing medium;

a head configured to eject ink onto the printing medium supported by the support portion;

an ejector device configured to eject a treatment liquid to a region including at least both ends of the support portion in a second direction intersecting the first direction, the treatment liquid for forming an underlay of the ink or an overlay of the ink on the printing medium supported by the support portion;

a bottom plate located below the support portion, both ends of the bottom plate being located outside the both ends of the support portion in the second direction; and a pair of partition plates extending in the first direction, the pair of partition plates being disposed between the both ends of the bottom plate in the second direction and between the bottom plate and the support portion in an up-down direction, wherein inner surfaces of the pair of partition plates are located between the both ends of the support portion in the second direction.

2. The printing device according to claim 1, wherein at least one of the pair of partition plates is configured to move in the second direction.

3. The printing device according to claim 1, further comprising:

a moving mechanism configured to move at least one of the pair of partition plates in the second direction; and a controller, wherein the controller is configured to control, based on support portion data comprising at least a width size of the support portion in the second direction, the moving mechanism such that the inner surfaces of the pair of partition plates are disposed between the both ends of the support portion in the second direction.

4. The printing device according to claim 1, wherein at least a part of an upper surface of the bottom plate is inclined downward toward a center of the bottom plate or toward an outer edge of the bottom plate.

5. The printing device according to claim 1, further comprising:

a pair of side plates extending upward from the both ends of the bottom plate, respectively.

6. The printing device according to claim 1, wherein the pair of partition plates extends upward from an upper surface of the bottom plate.

7. The printing device according to claim 6, wherein at least one of the pair of partition plates comprises a penetration portion penetrating in the second direction.

8. The printing device according to claim 1, further comprising:

a receiving portion disposed below the ejector device and above the bottom plate and on an outer side with respect to the pair of partition plates in the second direction, the receiving portion being configured to receive the treatment liquid from the ejector device.

9. The printing device according to claim 8, further comprising:

a waste liquid flow path communicating with the receiving portion.

* * * * *